(12) United States Patent
Zhou et al.

(10) Patent No.: US 12,284,250 B2
(45) Date of Patent: Apr. 22, 2025

(54) COMMUNICATION METHOD AND APPARATUS AND COMPUTER-READABLE STORAGE MEDIUM

(71) Applicant: HUAWEI TECHNOLOGIES CO., LTD., Shenzhen (CN)

(72) Inventors: Runze Zhou, Shanghai (CN); Mingyue Yang, Shanghai (CN); Zhongping Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/192,205

(22) Filed: Mar. 29, 2023

(65) Prior Publication Data
US 2023/0239361 A1    Jul. 27, 2023

Related U.S. Application Data

(63) Continuation of application No. PCT/CN2020/119722, filed on Sep. 30, 2020.

(51) Int. Cl.
*H04L 67/141* (2022.01)
*H04W 76/10* (2018.01)

(52) U.S. Cl.
CPC .......... *H04L 67/141* (2013.01); *H04W 76/10* (2018.02)

(58) Field of Classification Search
CPC ........ H04W 8/22; H04W 76/10; H04L 67/141
See application file for complete search history.

(56) References Cited

U.S. PATENT DOCUMENTS

2009/0328118 A1* 12/2009 Ravishankar ..... H04M 3/42042 725/106
2018/0077681 A1* 3/2018 Leroux ............ H04W 4/14
(Continued)

FOREIGN PATENT DOCUMENTS

| CN | 110049070 A | 7/2019 |
|---|---|---|
| CN | 110771251 A | 2/2020 |

(Continued)

OTHER PUBLICATIONS

Huawei, HiSilicon, TS 23.501: Terminology and role of applications and Application Functions. SA WG2 Meeting #119, Feb. 13-17, 2017, Dubrovnik, Croatia, S2-171060; 9 pages.
(Continued)

*Primary Examiner* — Jerry B Dennison
(74) *Attorney, Agent, or Firm* — Rimon PC

(57) ABSTRACT

Embodiments of this application disclose a communication method, an apparatus and a computer-readable storage medium. The method includes sending first request information to an access management network element, where the first request information carries an application capability of a terminal device. The method also includes receiving first response information sent by the access management network element. The method further includes sending a session establishment request to a session management network element based on the first response information, where the session establishment request requests to establish a connection to a first application network element. According to the technical solutions provided in this application, interaction signaling between a terminal device and a server can be reduced, and communication latency can be reduced.

20 Claims, 12 Drawing Sheets

(56) References Cited

U.S. PATENT DOCUMENTS

| | | | |
|---|---|---|---|
| 2018/0192390 A1 | 7/2018 | Li et al. | |
| 2018/0241582 A1* | 8/2018 | Nishimura | H04L 12/2823 |
| 2019/0215693 A1 | 7/2019 | Lee et al. | |
| 2019/0357136 A1 | 11/2019 | Li | |
| 2020/0186462 A1 | 6/2020 | D'Acunto et al. | |
| 2020/0221541 A1* | 7/2020 | Yan | H04W 48/16 |
| 2020/0329514 A1* | 10/2020 | Yu | H04W 8/02 |
| 2022/0360977 A1* | 11/2022 | Kim | H04L 65/80 |
| 2024/0056367 A1* | 2/2024 | Samdanis | H04L 41/5032 |

FOREIGN PATENT DOCUMENTS

| | | | |
|---|---|---|---|
| CN | 111279316 A | 6/2020 | |
| EP | 3745645 A1 | 12/2020 | |
| WO | 2018177656 A1 | 10/2018 | |
| WO | WO-2018232241 A1 * | 12/2018 | H04W 76/10 |
| WO | 2019154295 A1 | 8/2019 | |
| WO | 2020033628 A1 | 2/2020 | |

OTHER PUBLICATIONS

3GPP TS 23.273 V16.4.0 (Jul. 2020), 3rd Generation Partnership Project; Technical Specification Group Services and System Aspects; 5G System (5GS) Location Services (LCS); Stage 2 (Release 16); 96 pages.

3GPP TS 24.501 V17.0.0 (Sep. 2020), 3rd Generation Partnership Project; Technical Specification Group Core Network and Terminals; Non-Access-Stratum (NAS) protocol for 5G System (5GS); Stage 3; (Release 17); 1093 pages.

3GPP TS 29.572 V16.4.0 (Sep. 2020), 3rd Generation Partnership Project; Technical Specification Group Core Network and Terminals; 5G System; Location Management Services; Stage 3 (Release 16); 76 pages.

Huawei et al: "TS 23.502: AF influenced PDU session establishment and DN authentication/authorization via NEF," S2-175780, 3GPP TSG SA W62 Meeting #122bis Aug. 21-Aug. 25, 2017, Sophia Antipolis, France, total 11 pages.

* cited by examiner

COMMUNICATION METHOD AND APPARATUS AND COMPUTER-READABLE STORAGE MEDIUM

CROSS-REFERENCE TO RELATED APPLICATIONS

This application is a continuation of International Application No. PCT/CN2020/119722, filed on Sep. 30, 2020, the disclosure of which is hereby incorporated by reference in its entirety.

TECHNICAL FIELD

This application generally relates to the field of wireless communication technologies, and specifically, to a communication method and apparatus and a computer-readable storage medium.

BACKGROUND

Before executing a communication service, a terminal device typically needs to establish a user plane transmission channel (namely, a session connection) with a gateway device in a core network. In a 5th generation (5G) communication system, after receiving request information including a data network name (DNN) from the terminal device, a session management function (SMF) network element sends domain name system (DNS) request information that includes the DNN to a user plane function (UPF) network element. The UPF may obtain an internet protocol (IP) address through a domain name resolution. In this way, a server that is on the internet and that is used to serve an application of the terminal device is found.

In the foregoing process, the UPF may not directly find the to-be-accessed server by using a domain name, and a process of searching for the IP address by using the domain name may need to be implemented. This process may be referred to as the domain name resolution. As a result, when the terminal device interacts with the server, the signaling is roundabout, and communication latency may be caused.

SUMMARY

Embodiments of this application disclose a communication method, an apparatus and a computer-readable storage medium, to reduce interaction signaling between a terminal device and a server, and to reduce communication latency.

According to a first aspect, this application provides a communication method. The method may be applied to a terminal device, or may be applied to a module (for example, a chip) in the terminal device. An example in which the method is applied to the terminal device is used for description below. The communication method may include: sending first request information to an access management network element, where the first request information carries an application capability of the terminal device; receiving first response information sent by the access management network element; and sending a session establishment request to a session management network element based on the first response information, where the session establishment request requests to establish a connection to a first application network element.

In the solutions provided in this application, the terminal device may first send, to the access management network element, the first request information carrying the application capability of the terminal device. The application capability may be a positioning application capability, a vehicle-to-everything (V2X) application capability, a near-distance device-to-device (D2D) application capability, an unmanned aerial vehicle (UAV) application capability, a multimedia application capability, an augmented reality (AR)/a virtual reality (VR) application capability, or the like. After receiving the first request information, the access management network element may determine, based on the application capability of the terminal device, one or more application network elements provided services for the terminal device, and send the first response information to the terminal device. Then, the terminal device sends, to the session management network element based on the first response information, the session establishment request requesting to establish the connection to the first application network element. A network may establish a user plane connection between the terminal device and the application network element before the terminal device sends the session establishment request, and connect the terminal device to a native function server that is needed by the terminal device. In this way, the terminal device and the application network element may exchange a specific function request and response. Therefore, when the terminal device initiates a service request, interaction signaling between the terminal device and the server can be reduced, and communication latency can be reduced.

In a possible implementation, the session establishment request includes a service type of the terminal device.

In the solutions provided in this application, the session establishment request sent by the terminal device to the session management network element based on the first response information may include the service type of the terminal device. The service type may include a domain name system (DNN), single network slice selection assistance information (S-NSSAI), an application name (e.g., identity, ID), and an application type. The application type may be positioning, V2X, D2D, UAV, a multimedia application capability, AR/VR, or the like. In this way, after receiving the service type from the terminal device, the session management network element may determine application network elements to which the terminal device can be connected, so as to determine the first application network element based on the service type of the terminal device.

In a possible implementation, the session establishment request further includes location information of the terminal device.

In the solutions provided in this application, the session establishment request sent by the terminal device to the session management network element based on the first response information may further include the location information of the terminal device. In this way, the session management network element may select, for the terminal device based on the location information of the terminal device, an application network element that is close to the terminal device to communicate with the terminal device, and the terminal device may access a nearby application server. Therefore, a communication rate can be increased.

In a possible implementation, the first response information includes indication information, and the indication information indicates the terminal device to connect to the one or more application network elements that provide a service for the terminal device.

In the solutions provided in this application, the access management network element determines, based on the application capability of the terminal device, one or more application network elements that provide a service for the terminal device, and may send, to the terminal device by using the first response information, indication information indicating the terminal device to connect to the one or more application network elements that provide a service for the terminal device.

In a possible implementation, the session establishment request includes identification information of the first application network element.

In the solutions provided in this application, the session establishment request sent by the terminal device to the session management network element based on the first response information may include the identification information of the first application network element, and the session management network element may determine that the terminal device needs to perform a user plane connection to the first application network element. Therefore, when the terminal device initiates a service request to the network, interaction signaling can be reduced, and communication latency can be reduced.

In a possible implementation, the first response information includes identification information of one or more application network elements. The first application network element is determined based on a service type of the terminal device and the identification information of the one or more application network elements.

In the solutions provided in this application, the access management network element determines, based on the application capability of the terminal device, the one or more application network elements that provide a service for the terminal device, and may send the identification information of the one or more application network elements to the terminal device by using the first response information. After receiving the first response information, the terminal device may determine the first application network element based on the service type and the identification information of the one or more application network elements.

In a possible implementation, the first response information further includes location information corresponding to the one or more application network elements. That the first application network element is determined based on a service type of the terminal device and the identification information of the one or more application network elements includes: determining the first application network element based on the service type of the terminal device, the identification information of the one or more application network elements, and the location information corresponding to the one or more application network elements.

In the solutions provided in this application, the access management network element sends the identification information of the one or more application network elements to the terminal device by using the first response information, and may further send the location information corresponding to the one or more application network elements to the terminal device. After receiving the first response information, the terminal device may determine the first application network element based on the service type, the identification information of the one or more application network elements, and the location information corresponding to the one or more application network elements. In this way, the first application network element may be an application network element that is close to the terminal device, so that the terminal device accesses a nearby application server. Therefore, a communication rate can be increased.

In a possible implementation, the identification information of the one or more application network elements includes a type of the one or more application network elements. The determination of the first application network element based on the service type of the terminal device, the identification information of the one or more application network elements, and the location information corresponding to the one or more application network elements includes: determining the first application network element based on the service type of the terminal device, the type of the one or more application network elements, and the location information corresponding to the one or more application network elements.

In the solutions provided in this application, the identification information of the one or more application network elements sent by the access management network element to the terminal device by using the first response information may include the type of the one or more application network elements. After receiving the first response information, the terminal device may determine the first application network element based on the service type, the type of the one or more application network elements, and the location information corresponding to the one or more application network elements. Each application network element may have a different service type. After connecting to an application network element of a specific type, the terminal device may select the first application network element based on a capability of the application network element, that is, a service type supported by the application network element.

In a possible implementation, the communication method further includes: receiving second information from the access management network element, where the second information includes the identification information of the first application network element.

In the solutions provided in this application, the terminal device may receive the second information that is sent by the access management network element and that includes the identification information of the first application network element, and then send, to the session management network element based on the first response information, the session establishment request that includes the identification information of the first application network element. The session management network element may determine that the terminal device needs to perform a user plane connection to the first application network element. Therefore, when the terminal device initiates a service request to the network, interaction signaling can be reduced, and communication latency can be reduced.

In a possible implementation, the communication method further includes: receiving a session establishment response from the session management network element, where the session establishment response includes address information of the first application network element; and communicating with the first application network element based on the address information of the first application network element.

In the solutions provided in this application, after establishing a connection between a user plane network element and the first application network element based on the session establishment request, the session management network element may send, to the terminal device, the session establishment response that includes the address information of the first application network element. The terminal device may communicate with the first application network element based on the address information of the first application network element.

According to a second aspect, this application provides a communication method. The method may be applied to a session management network element, or may be applied to a module (for example, a chip) in the session management network element. An example in which the method is applied to the session management network element is used for description below. The method may include: receiving a session establishment request sent by a terminal device, where the session establishment request requests to establish a connection to a first application network element; and establishing a connection between a user plane network element and the first application network element based on the session establishment request.

In the solutions provided in this application, after receiving the session establishment request that is sent by the terminal device and that requests to establish the connection to the first application network element, the session management network element may establish the connection between the user plane network element and the first application network element based on the session establishment request. A network may establish a user plane connection between the terminal device and an application network element before the terminal device sends the session establishment request, and connect the terminal device to a native function server that is needed by the terminal device. In this way, the terminal device and the application network element may exchange a specific function request and response. Therefore, when the terminal device initiates a service request, interaction signaling between the terminal device and the server can be reduced, and communication latency can be reduced.

It should be understood that the second aspect is performed by the session management network element, and specific content of the second aspect corresponds to content of the first aspect. For corresponding features of the second aspect and beneficial effects achieved by the second aspect, refer to descriptions of the first aspect. To avoid repetition, detailed descriptions are appropriately omitted herein.

In a possible implementation, the session establishment request includes a service type of the terminal device. The first application network element is determined based on the service type of the terminal device.

In the solutions provided in this application, after receiving the session establishment request that is sent by the terminal device and that includes the service type of the terminal device, the session management network element may determine the first application network element based on the service type of the terminal device.

In a possible implementation, the communication method further includes: obtaining subscription data of the terminal device from a unified data management network element. That the first application network element is determined based on the service type of the terminal device includes: determining the first application network element based on the service type of the terminal device and the subscription data of the terminal device.

In the solutions provided in this application, after receiving the session establishment request that is sent by the terminal device and that includes the service type of the terminal device, the session management network element may further obtain the subscription data of the terminal device from a data management network element, and then determine the first application network element based on the service type of the terminal device and the subscription data of the terminal device.

In a possible implementation, the session establishment request further includes location information of the terminal device. The determination of the first application network element based on the service type of the terminal device and the subscription data of the terminal device includes: determining the first application network element based on the service type of the terminal device, the subscription data of the terminal device, and the location information of the terminal device.

In the solutions provided in this application, the session management network element receives the session establishment request that is sent by the terminal device and that includes the service type of the terminal device. The session establishment request may further include the location information of the terminal device. The session management network element may determine the first application network element based on the service type of the terminal device, the subscription data of the terminal device, and the location information of the terminal device. In this way, the session management network element may select, for the terminal device based on the location information of the terminal device, an application network element that is close to the terminal device to communicate with the terminal device, and the terminal device may access a nearby application server. Therefore, a communication rate can be increased.

In a possible implementation, the session establishment request includes identification information of the first application network element.

In a possible implementation, the communication method further includes: determining address information of the first application network element based on the identification information of the first application network element; and sending a user plane connection establishment request to the first application network element based on the address information of the first application network element.

In the solutions provided in this application, in a process in which the network establishes the user plane connection between the terminal device and the application network element before the terminal device sends the session establishment request, and connects the terminal device to the native function server that is needed by the terminal device, the session management network element may determine the address information of the first application network element based on the identification information of the first application network element that is received from the terminal device or the identification information of the first application network element that is determined by the session management network element, and then send the user plane connection establishment request to the first application network element based on the address information of the first application network element. In this way, the network establishes the user plane connection between the terminal device and the application network element.

In a possible implementation, the establishing a connection between a user plane network element and the first application network element based on the session establishment request includes: sending an N4 connection establishment request to the user plane network element based on the session establishment request, where the N4 connection establishment request includes address information of the first application network element; and sending user plane connection update information to the first application network element based on the address information of the first application network element, where the user plane connection update information includes address information of the user plane network element.

In the solutions provided in this application, in a process in which the network establishes the user plane connection between the terminal device and the application network element before the terminal device sends the session establishment request, and connects the terminal device to the native function server that is needed by the terminal device, the session management network element may establish the connection between the user plane network element and the first application network element. Specifically, the session management network element may send, to the user plane network element based on the session establishment request, the N4 connection establishment request that includes the address information of the first application network element, and then send, to the first application network element based on the address information of the first application network element, the user plane connection update information that includes the address information of the user plane network element. In this way, the network establishes the user plane connection between the terminal device and the application network element.

In a possible implementation, the communication method further includes: sending a session establishment response to the terminal device, where the session establishment response includes the address information of the first application network element.

According to a third aspect, this application provides a communication method. The method may be applied to an access management network element, or may be applied to a module (for example, a chip) in the access management network element. An example in which the method is applied to the access management network element is used for description below. The method may include: receiving first request information sent by a terminal device, where the first request information carries an application capability of the terminal device; and determining, based on the application capability of the terminal device, one or more application network elements that provide a service for the terminal device.

In the solutions provided in this application, before sending a session establishment request to a session management network element, the terminal device may first send, to the access management network element, the first request information that carries the application capability of the terminal device. After receiving the first request information, the access management network element may determine, based on the application capability of the terminal device, the one or more application network elements provided services for the terminal device, and send first response information to the terminal device. Then, the terminal device sends, based on the first response information, the session establishment request requesting to establish a connection to a first application network element. A network may establish a user plane connection between the terminal device and an application network element before the terminal device sends the session establishment request, and connect the terminal device to a native function server that is needed by the terminal device. In this way, the terminal device and the application network element may exchange a specific function request and response. Therefore, when the terminal device initiates a service request, interaction signaling between the terminal device and the server can be reduced, and communication latency can be reduced.

It should be understood that the third aspect is performed by the access management network element, and specific content of the third aspect corresponds to content of the first aspect. For corresponding features of the third aspect and beneficial effects achieved by the third aspect, refer to descriptions of the first aspect. To avoid repetition, detailed descriptions are appropriately omitted herein.

In a possible implementation, subscription data of the terminal device sent by a data management network element is received. The determination, based on the application capability of the terminal device, of the one or more application network elements that provide a service for the terminal device includes: determining the one or more application network elements based on the application capability of the terminal device and the subscription data of the terminal device.

In a possible implementation, the communication method further includes: sending first response information to the terminal device.

In a possible implementation, the first response information includes indication information, and the indication information indicates the terminal device to connect to the one or more application network elements that provide a service for the terminal device.

In a possible implementation, the first response information includes identification information of the one or more application network elements.

In a possible implementation, the first response information further includes location information corresponding to the one or more application network elements.

According to a fourth aspect, this application provides a communication method. The method may be applied to an access management network element, or may be applied to a module (for example, a chip) in the access management network element. An example in which the method is applied to the access management network element is used for description below. The method may include: receiving an application request sent by a network exposure network element, where the application request includes an application type and identification information of a terminal device; and determining a first application network element based on the application type.

In the solutions provided in this application, an application client (APP client) sends, to the network exposure network element, the application request that includes the application type and the identifier of the terminal device. The network exposure network element may determine the access management network element that serves the terminal device, and send, to the access management network element, the application request that includes the application type and the identification information of a terminal device. After receiving the application request, the access management network element may determine the first application network element based on the application type, so that a network can establish a user plane connection between the terminal device and an application network element before the terminal device sends a session establishment request, and connect the terminal device to a native function server that is needed by the terminal device. In this way, the terminal device and the application network element may exchange a specific function request and response. Therefore, when the terminal device initiates a service request, interaction signaling between the terminal device and the server can be reduced, and communication latency can be reduced.

It should be understood that the fourth aspect is performed by the access management network element, and specific content of the fourth aspect corresponds to content of the first aspect. For corresponding features of the fourth aspect and beneficial effects achieved by the fourth aspect, refer to descriptions of the first aspect. To avoid repetition, detailed descriptions are appropriately omitted herein.

In a possible implementation, the communication method further includes: sending second information to the terminal device, where the second information includes identification information of the first application network element.

In a possible implementation, the communication method further includes: sending an application response to the network exposure network element, where the application response includes an application result.

According to a fifth aspect, this application provides a communication apparatus. The apparatus may be a terminal device, or may be a module (for example, a chip) in the terminal device. The apparatus may include a transceiver unit (e.g., transceiver circuit), configured to send first request information to an access management network element, where the first request information carries an application capability of the terminal device.

The transceiver unit is further configured to receive first response information sent by the access management network element.

The transceiver unit is further configured to send a session establishment request to a session management network element based on the first response information, where the session establishment request requests to establish a connection to a first application network element.

In a possible implementation, the session establishment request includes a service type of the terminal device.

In a possible implementation, the session establishment request further includes location information of the terminal device.

In a possible implementation, the first response information includes indication information.

In a possible implementation, the session establishment request includes identification information of the first application network element.

In a possible implementation, the first response information includes identification information of one or more application network elements.

The communication apparatus further includes: a processing unit (e.g., processing circuit), configured to determine the first application network element based on a service type of the terminal device and the identification information of the one or more application network elements.

In a possible implementation, the first response information further includes location information corresponding to the one or more application network elements.

That a processing unit determines the first application network element based on a service type of the terminal device and the identification information of the one or more application network elements includes: determining the first application network element based on the service type of the terminal device, the identification information of the one or more application network elements, and the location information corresponding to the one or more application network elements.

In a possible implementation, the identification information of the one or more application network elements includes a type of the one or more application network elements.

That the processing unit determines the first application network element based on the service type of the terminal device, the identification information of the one or more application network elements, and the location information corresponding to the one or more application network elements includes: determining the first application network element based on the service type of the terminal device, the type of the one or more application network elements, and the location information corresponding to the one or more application network elements.

In a possible implementation, the transceiver unit is further configured to receive second information sent by the access management network element, where the second information includes the identification information of the first application network element.

In a possible implementation, the transceiver unit is further configured to receive a session establishment response from the session management network element, where the session establishment response includes address information of the first application network element.

The processing unit is further configured to communicate with the first application network element based on the address information of the first application network element.

According to a sixth aspect, this application provides a communication apparatus. The apparatus may be a session management network element, or may be a module (for example, a chip) in the session management network element. The apparatus may include: a transceiver unit, configured to receive a session establishment request sent by a terminal device, where the session establishment request requests to establish a connection to a first application network element; and a processing unit, configured to establish a connection between a user plane network element and the first application network element based on the session establishment request.

In a possible implementation, the session establishment request includes a service type of the terminal device.

The processing unit is further configured to determine the first application network element based on the service type of the terminal device.

In a possible implementation, the transceiver unit is further configured to obtain subscription data of the terminal device from a data management network element.

That the processing unit determines the first application network element based on the service type of the terminal device includes: determining the first application network element based on the service type of the terminal device and the subscription data of the terminal device.

In a possible implementation, the session establishment request further includes location information of the terminal device.

That the processing unit determines the first application network element based on the service type of the terminal device and the subscription data of the terminal device includes: determining the first application network element based on the service type of the terminal device, the subscription data of the terminal device, and the location information of the terminal device.

In a possible implementation, the session establishment request includes identification information of the first application network element.

In a possible implementation, the processing unit is further configured to determine address information of the first application network element based on the identification information of the first application network element.

The transceiver unit is further configured to send a user plane connection establishment request to the first application network element based on the address information of the first application network element.

In a possible implementation, that a processing unit establishes a connection between a user plane network element and the first application network element based on the session establishment request includes: sending an N4 connection establishment request to the user plane network element based on the session establishment request, where the N4 connection establishment request includes address information of the first application network element; and sending user plane connection update information to the first application network element based on the address information of the first application network element, where the user plane connection update information includes address information of the user plane network element.

In a possible implementation, the transceiver unit is further configured to send a session establishment response to the terminal device, where the session establishment response includes the address information of the first application network element.

According to a seventh aspect, this application provides a communication apparatus. The apparatus may be an access management network element, or may be a module (for example, a chip) in the access management network element. The apparatus may include: a transceiver unit, configured to receive first request information sent by a terminal device, where the first request information carries an application capability of the terminal device; and a processing unit, configured to determine, based on the application capability of the terminal device, one or more application network elements that provide a service for the terminal device.

In a possible implementation, the transceiver unit is further configured to receive subscription data of the terminal device sent by a data management network element.

That a processing unit determines, based on the application capability of the terminal device, one or more application network elements that provide a service for the terminal device includes: determining the one or more application network elements based on the application capability of the terminal device and the subscription data of the terminal device.

In a possible implementation, the transceiver unit is further configured to send first response information to the terminal device.

In a possible implementation, the first response information includes indication information, and the indication information indicates the terminal device to connect to the one or more application network elements that provide a service for the terminal device.

In a possible implementation, the first response information includes identification information of the one or more application network elements.

In a possible implementation, the first response information further includes location information corresponding to the one or more application network elements.

According to an eighth aspect, this application provides a communication apparatus. The apparatus may be an access management network element, or may be a module (for example, a chip) in the access management network element. The apparatus may include: a transceiver unit, configured to receive an application request sent by a network exposure network element, where the application request includes an application type and identification information of a terminal device; and a processing unit, configured to determine a first application network element based on the application type.

In a possible implementation, the transceiver unit is further configured to send second information to the terminal device, where the second information includes identification information of the first application network element.

In a possible implementation, the transceiver unit is further configured to send an application response to the network exposure network element, where the application response includes an application result.

According to a ninth aspect, this application provides a communication apparatus. The communication apparatus may be a terminal device, or may be a module (for example, a chip) in the terminal device. The communication apparatus may include a processor, a memory, an input interface, and an output interface, where the input interface is configured to receive information from another communication apparatus other than the communication apparatus (e.g., a second communication apparatus), the output interface is configured to output information to the another communication apparatus other than the communication apparatus, and the processor invokes a computer program stored in the memory to perform the communication method according to any one of the first aspect or the implementations of the first aspect.

According to a tenth aspect, this application provides a communication apparatus. The communication apparatus may be a session management network element, or may be a module (for example, a chip) in the session management network element. The communication apparatus may include a processor, a memory, an input interface, and an output interface, where the input interface is configured to receive information from another communication apparatus other than the communication apparatus, the output interface is configured to output information to the another communication apparatus other than the communication apparatus, and the processor invokes a computer program stored in the memory to perform the communication method according to any one of the second aspect or the implementations of the second aspect.

According to an eleventh aspect, this application provides a communication apparatus. The communication apparatus may be an access management network element, or may be a module (for example, a chip) in the access management network element. The communication apparatus may include a processor, a memory, an input interface, and an output interface, where the input interface is configured to receive information from another communication apparatus other than the communication apparatus, the output interface is configured to output information to the another communication apparatus other than the communication apparatus, and the processor invokes a computer program stored in the memory to perform the communication method according to any one of the third aspect or the implementations of the third aspect, or perform the communication method according to any one of the fourth aspect or the implementations of the fourth aspect.

According to a twelfth aspect, this application provides a communication system. The communication system includes the communication apparatus in the ninth aspect, the communication apparatus in the tenth aspect, and at least one communication apparatus in the eleventh aspect.

According to a thirteenth aspect, this application provides a computer-readable storage medium, where the computer-readable storage medium stores a computer program or computer instructions; and when the computer program or the computer instructions are run, some or all steps of the communication method according to any one of the first aspect and the possible implementations of the first aspect, any one of the second aspect and the possible implementations of the second aspect, any one of the third aspect and the possible implementations of the third aspect, and any one of the fourth aspect and the possible implementations of the fourth aspect are performed.

According to a fourteenth aspect, this application provides a computer program product including executable instructions. When the computer program product runs on user equipment, some or all steps of the communication method according to any one of the first aspect and the possible implementations of the first aspect, any one of the second aspect and the possible implementations of the second aspect, any one of the third aspect and the possible implementations of the third aspect, and any one of the fourth aspect and the possible implementations of the fourth aspect are performed.

According to a fifteenth aspect, this application provides a chip system. The chip system includes a processor, and may further include a memory, configured to implement the communication method according to any one of the first aspect and the possible implementations of the first aspect, any one of the second aspect and the possible implementations of the second aspect, any one of the third aspect and the possible implementations of the third aspect, and any one of the fourth aspect and the possible implementations of the fourth aspect. The chip system may include a chip, or may include a chip and another discrete component.

DESCRIPTION OF EMBODIMENTS

Figure 1:
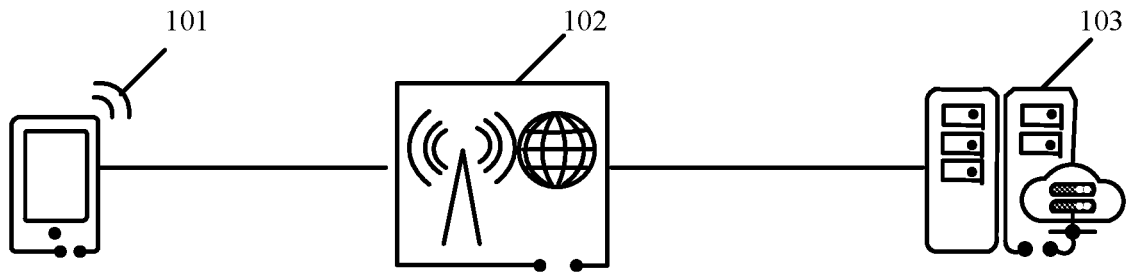
FIG. 1 is a schematic diagram of a structure of accessing a network by a client according to an embodiment of this application.

For ease of understanding this application, related technical knowledge included in embodiments of this application is described herein first.
1. Services Supported by a Mobile Network A public land mobile network (PLMN) is a mobile network for short, and is a network established and operated by a government or an operator authorized by the government for a purpose of providing a land mobile communication service for the public. The mobile network is a wireless communication system, including a 2nd generation mobile network (2G), a 3rd generation mobile network (3G), and a 4th generation mobile network ( ). A current wireless communication technology has developed to a 5th generation mobile network (5G).

An international standard for a 5G network is defined by the 3rd generation partnership project (3GPP). In 2019, China has launched commercial services of the 5G network. The 5G network mainly supports three types of services: an enhanced mobile broadband (eMBB) service, an ultra-reliable and low-latency communication (URLLC) service, and a massive machine type communication (mMTC) service.
(1) eMBB Scenario A 5G eMBB service may meet service requirements of a user for a high data rate and high mobility, and is widely used in scenarios such as an internet video scenario and a live broadcast scenario. In January 2017, a 5G fixed wireless streaming media test was completed on a 39 GHz system. In a lab, a speed has reached 14 Gbit/s, and latency was less than 3 ms. In June 2017, in a second 5G test, the user was allowed to watch live streaming on a 5G network. The test has lasted for several months. This test used a 5G mobile test platform and a 5G wireless access network to transmit real-time television content through fixed wireless 5G signals, and an experience rate of 1 Gbit/s is initially reached. The Pyeongchang Winter Olympics held in February 2018 became a debut show of the 5G network. Typical real-sense technologies such as 360-degree virtual reality (360VR), synchronous game viewing (sync view), and time slicing were launched using 5G. The 360 VR allows the user to view an entire game field 360 degrees, and may select an athlete from a play screen to track and watch. The synchronous game viewing allows the user to watch a game from a perspective of an athlete through a 5G communication module built in an ultra-high-speed camera. The time slicing uses dozens of cameras to capture images, and can provide stereoscopic images and capture wonderful moments. A real-sense technology may achieve full coverage in a stadium and an experience hall, and an off-site user may also have experience on a device such as a smartphone.
(2) URLLC Scenario A 5G technology may support ultra-reliable and low-latency machine type communication, and may be widely applied to scenarios such as a self-driving scenario, an internet of vehicles scenario, and a smart healthcare scenario. In February 2017, a 28 GHz 5G test network achieved data transmission at a peak rate of 3.6 Gbit/s between interconnected vehicles running at a speed of 170 km/h. The connected vehicles may receive nearby traffic and obstacle information. In addition, media in the vehicles have a capability of playing a 4K ultra high definition (UHD) video, a VR live performance, and a three-dimensional (e.g., 3 dimensions, 3D) video clip.

In June 2017, a Mobile World Congress in Shanghai showcased applications of 5G technologies in the smart healthcare and the internet of vehicles. The demonstration used a new radio (NR) base station that supports independent deployment, a service-based next-generation core network, and a service-flow-based quality of service (QoS) technology. This may result in a high-speed and low-latency real-time communication between an ambulance and hospital staff during patient transport, and may result in a real-time transmission of high-bandwidth images such as an X-ray and a video of a patient to a hospital. Therefore, a doctor may diagnose an illness of the patient and make a preliminary preparation during the patient transport, so as to save time for treatment of the patient.
(3) mMTC Scenario mMTC takes advantage of characteristics of low power consumption and wide coverage of 5G, and is oriented to a scenario in which a large quantity of small sensors are used for data collection, analysis, and application. In a 5G ecosystem, a 5G technology may be capable of adapting to other technical standards, such as a standard for a long term evolution level (e.g., long term evolution category M1, LTE Cat-M1) of a low power wide area (LPWA) technology and a standard for a narrow band internet of things (NB-IoT). An operator outside China actively deploys networks such as an LTE Cat-M1 and an NB-IoT, and this lays a foundation for 5G massive machine type communication.

In March 2017, the LTE Cat-M1 network was put into commercial use on a large scale, and is mainly used as a wireless access solution for internet of things enterprises. An internet of things platform (e.g., thing space) based on a world wide web (Web) provides an open application programming interface (API) for a developer to independently develop and promote a new internet of things service, and for a user to manage an internet of things environment of the user in an end-to-end manner. In the future, the internet of things platform will reconstruct eight major industries, including manufacturing, healthcare, energy and public utilities, agricultural science and technology, and financial services.

In 2017, the NB-IoT deployed on a large scale was expected to cover a global network in 2020. About 85% of 4G base stations can support the NB-IoT through simple software upgrade. A frequency band of the NB-IoT network used for commercial testing is 800 MHz, which is consistent with a frequency band of a local 4G network. Update of the 4G base station and deployment of the NB-IoT can be completed within several hours without a need to re-establish a dedicated base station. This greatly reduces costs of the deployment of the NB-IoT. Efficient deployment of the NB-IoT lays a solid foundation for development of internet of things services. Currently, the related internet of things services include a smart grid service, a public environment and energy monitoring service, a smart city service, an asset tracking service, and the like.

2. Native Function of a Mobile Network

For a capability of the mobile network, the foregoing three types of services essentially provide a data connection. When a user browses a web page, watches a video, or plays a game on a mobile phone, an application (APP) on the mobile phone is associated with a service type of a 5G network. Most APPs on a smartphone are associated with an eMBB service. There is an N:1 correspondence between applications on the mobile phone and a 5G network service.

FIG. 1 is a schematic diagram of a structure of accessing a network by a client according to this application. As shown in FIG. 1, the structure may include a client 101, a network 102, and an application server 103. The network 102 may be considered as a network cable that connects the client 101 to the application server 103. A function of the network is mainly to provide a data connection between the application server 103 and the client 101. The network 102 may provide a corresponding data connection capability based on different requirements of a user service. This communication model turns the network 102 into a "pipe", with real content of communication appearing between the client 101 and the application server 103.

The mobile network also launches many native services, such as a positioning service, a short-distance discovery service, and a latency-sensitive service. These services not only use a data connection capability of the mobile network, but also use other capabilities, such as location calculation, broadcast code calculation and allocation, and transmission latency calculation. The mobile network provides these native functions, and a corresponding function device is deployed in the network 102. Each native function has an independent application network element.

3. Service Model of a Native Function of a Mobile Network

The service model refers to an entire process of a service.

A service model of a native service, for example, a positioning function, of the mobile network may be abstracted as follows: A user expects to know a current location of the user, and initiates a positioning request to the network. A positioning function application network element of the network calculates the location of the user, and returns a positioning result to the user.

A service model of another native service, for example, a short-distance service, of the mobile network may be abstracted as follows: a user, as a short-distance service client, requests a short-distance service from the network. The positioning function application network element of the network determines an identifier of the short-distance service of the user, and allocates the identifier of the short-distance service to the user.

Figure 2:
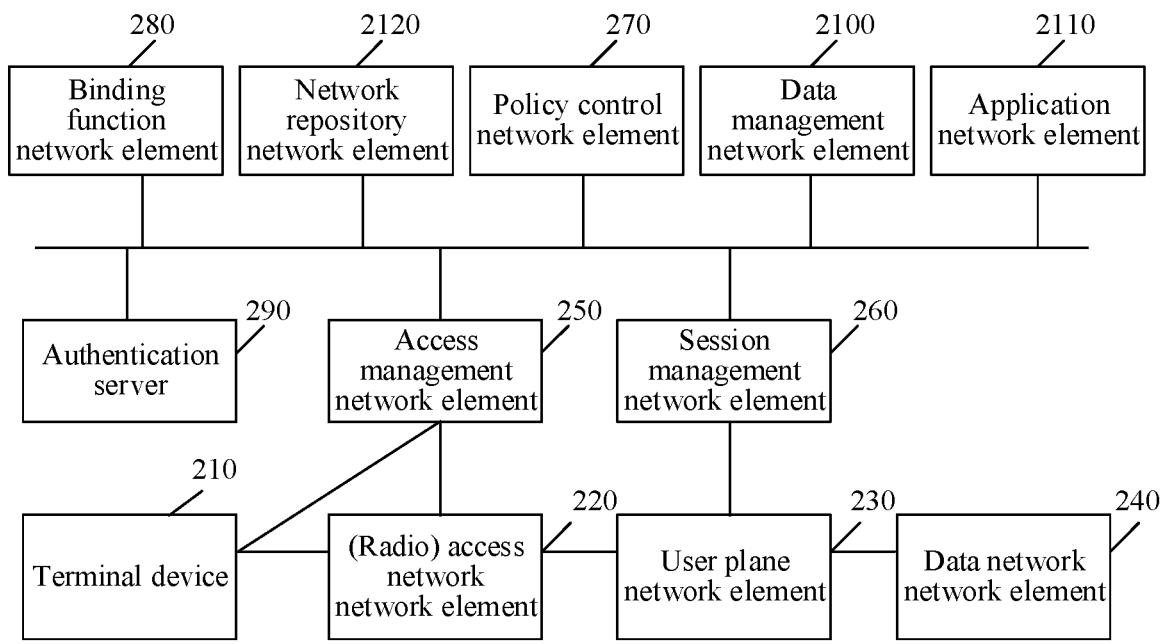
FIG. 2 is a schematic diagram of a network architecture according to an embodiment of this application.

To better understand a communication method and apparatus and a computer-readable storage medium that are provided in embodiments of this application, a network architecture used in embodiments of this application is first described below. FIG. 2 is a schematic diagram of a network architecture according to an embodiment of this application, and is an example of a communication system. As shown in FIG. 2, the network architecture may include the following devices, network elements, and networks.

1. A terminal device 210 may include various handheld devices, vehicle-mounted devices, wearable devices, computing devices that have a wireless communication function, or other processing devices connected to a wireless modem, and terminals in various forms, for example, a mobile station (MS), a terminal, user equipment (UE), and a soft client. For example, the terminal may be a water meter, an electricity meter, or a sensor.

2. A radio access network (RAN) network element 220 is configured to provide a network access function for authorized terminals in a specific area, and can use transmission tunnels with different quality based on levels of the terminals, service requirements, and the like. The RAN network element can manage a radio resource and provide an access service for the terminal, to forward a control signal and terminal data between the terminal and a core network. The network element may also be understood as a base station in a conventional network.

A RAN network element in a non-public network (NPN) network can further control an unauthorized terminal device to attempt to access or select the NPN network.

3. A user plane network element 230 is used for packet routing and forwarding, quality of service (QoS) processing on user plane data, and the like. In a 5G communication system, the user plane network element may be a user plane function (UPF) network element. In a future communication system, the user plane network element may still be the UPF network element, or may have another name. This is not limited in this application.

4. A data network network element 240 is configured to provide a network for data transmission. In the 5G communication system, the data network network element may be a data network (DN) network element. In the future communication system, the data network element may still be the DN network element, or may have another name. This is not limited in this application.

5. An access management network element 250 is used for mobility management, access management, and the like, and may be configured to implement functions, for example, lawful interception and access authorization/authentication, other than session management in functions of a mobility management entity (MME). In the 5G communication system, the access management network element may be an access management function (AMF) network element. In future communication systems, the access management network element may still be the AMF network element, or may have another name. This is not limited in this application.

6. A session management network element 260 is mainly configured to manage a session, assign and manage an internet protocol (IP) address of a terminal device, select and manage an endpoint of a user plane function interface and a policy control and charging function interface, notify downlink data, and the like. In the 5G communication system, the session management network element may be a session management function (SMF) network element. In the future communication system, the session management network element may still be the SMF network element, or may have another name. This is not limited in this application.

7. A policy control network element 270 is configured to: guide a unified policy framework of network behavior, and provide policy rule information for a control plane function network element (for example, the AMF or SMF network elements), and the like. In a 4G communication system, the policy control network element may be a policy and charging rules function (PCRF) network element. In the 5G communication system, the policy control network element may be a policy control function (PCF) network element. In future communication systems, the policy control network element may still be the PCF network element, or may have another name. This is not limited in this application.

8. A binding function network element 280 is configured to search for a PCF associated with a session. In the 5G communication system, the binding function network element may be a binding support function (BSF) network element. In future communication systems, the binding support network element may still be the BSF network element, or may have another name. This is not limited in this application.

9. An authentication server 290 is configured to authenticate a service, generate a key to implement two-way authentication for a terminal device, and support a unified authentication framework. In the 5G communication system, the authentication server may be an authentication server function (AUSF) network element. In future communication systems, the authentication server function network element may still be the AUSF network element, or may have another name. This is not limited in this application.

10. A data management network element 2100 is configured to process an identifier of a terminal device, perform access authentication, registration, and mobility subscription management, and the like. In the 5G communication system, the data management network element may be a unified data management (UDM) network element. In future communication systems, the unified data management network element may still be the UDM network element, or may have another name. This is not limited in this application.

11. An application network element 2110 is configured to perform application-affected data routing, access a network exposure function network element, interact with a policy framework to perform policy control, and the like. In the 5G communication system, the application network element may be an application function (AF) network element. In future communication systems, the application network element may still be the AF network element, or may have another name. This is not limited in this application.

12. A network repository network element 2120 is configured to maintain real-time information of all network function entities and services in a network. In the 5G communication system, the network repository network element may be a network registration function (NRF) network element, or may be a network exposure network element (NEF). In future communication systems, the network repository network element may still be the NRF network element, or may have another name. This is not limited in this application.

Each of the foregoing network elements in the core network may also be referred to as a functional entity, and may be a network element implemented on dedicated hardware, or may be a software instance running on dedicated hardware, or an instance of a virtualization function on an appropriate platform. For example, a virtualization platform may be a cloud platform.

It should be noted that the network architecture shown in FIG. 2 is not limited to including only the network elements shown in the figure, and may further include other devices not shown in the figure. Details are not listed one by one herein in this application.

It should be noted that a distribution form of the network elements in the core network is not limited in embodiments of this application. The distribution form shown in FIG. 2 is merely an example, and is not limited in this application.

It should be understood that names of all network elements in this application are merely used as examples. In future communication, for example, 6G communication, names of the network elements may also be referred to as other names. Alternatively, in the future communication, for example, the 6G communication, the network elements in this application may be replaced with other entities, devices, or the like that have a same function. This is not limited in this application. Unified descriptions are provided herein, and details are not described below again.

It should be noted that the network architecture shown in FIG. 2 does not constitute a limitation on a 5G network. Optionally, the method in some embodiments are further applied to various future communication systems, for example, a 6G communication network or another communication network.

In addition, although not shown in FIG. 2, the communication system may further include another network element, device, network entity, or network subsystem, for example, a binding support function (BSF) network element. Details are not described in embodiments of this application.

Optionally, various network elements in embodiments of this application may be a communication device, or may be a chip, a chip system, or the like that can be used in the communication device. This is not limited in embodiments of this application.

It should be noted that the foregoing network elements may be different communication devices, or may be different communication apparatuses, modules, or subsystems in a same communication device. This is not limited in embodiments of this application.

Optionally, the terminal device (e.g., terminal) in embodiments of this application may be a device, for example, a terminal device or a chip that may be used in the terminal device, configured to implement a wireless communication function. The terminal device may be UE, an access terminal, a terminal unit, a terminal station, a mobile station, a remote station, a remote terminal, a mobile device, a wireless communication device, a terminal agent, a terminal apparatus, or the like in the 5G network or a future evolved PLMN. The access terminal may be a cellular phone, a cordless phone, a session initiation protocol (SIP) phone, a wireless local loop (WLL) station, a personal digital assistant (PDA), a handheld device or a computing device having a wireless communication function, another processing device, vehicle-mounted device, or wearable device connected to a wireless modem, a VR terminal device, an AR terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like. The terminal may be mobile or a fixed.

Optionally, an access network device in embodiments of this application generally includes a device, for example, a base station, a broadband network gateway (BNG), an aggregation switch, or a non-3GPP access device, configured to access a core network. The base station may include base stations in various forms, for example, a macro base station, a micro base station (also referred to as a small cell), a relay station, and an access point.

Optionally, each network element, network device, or terminal device in embodiments of this application may also be referred to as a communication apparatus. The communication apparatus may be a general-purpose device or a special-purpose device. This is not specifically limited in embodiments of this application.

Optionally, a related function of the policy control network element or the network device in embodiments of this application may be implemented by one device, or may be jointly implemented by a plurality of devices, or may be implemented by one or more functional modules in one device. This is not limited in embodiments of this application. It may be understood that the foregoing function may be a network element in a hardware device, or a software function running on special-purpose hardware, or a combination of hardware and software, or a virtualization function instantiated on a platform (for example, a cloud platform).

Further, the AMF network element may be briefly referred to as an AMF, the SMF network element may be briefly referred to as an SMF, and the UDM network element may be briefly referred to as a UDM. In other words, each AMF may be replaced with an access management network element, each SMF may be replaced with a session management network element, and each UDM may be replaced with a data management network element described below in this application. Other network elements are similar.

For ease of description, in this application, a method for UPF selection or SMF selection is described by using an example in which an apparatus is an AMF entity, an SMF entity, or a UDM entity. For an implementation method in which the apparatus is a chip in the AMF entity, a chip in the SMF entity, or a chip in the UDM entity, refer to specific descriptions in which the apparatus is the SMF entity, the AMF entity, or an NRF entity. Details are not described again.

The UPF corresponds to a service area, and the UE has mobility. When the UE moves out of a service range of the UPF or a service capability that is needed by the UE exceeds the service range of the UPF, for ease of description, the UPF is referred to as a first UPF, that is, the UE moves out of a service range of the first UPF or the service capability that is needed by the UE exceeds the service range of the first UPF, the SMF may select a second UPF for the UE to provide a better service for the UE, where a service range corresponding to the second UPF includes a location of the UE or the service capability that is needed by the UE, and modify a user plane path of a protocol data unit (PDU) session to a path from the UE to the second UPF.

There is only one UPF in the network architecture shown in FIG. 2. Based on the foregoing basic network architecture, 5G may further support insertion of a plurality of session anchor UPFs on the user plane path (namely, a data path) of the PDU session, to support a connection to a local DN, so that the UE can access a nearby application server in the local DN.

Figure 3:
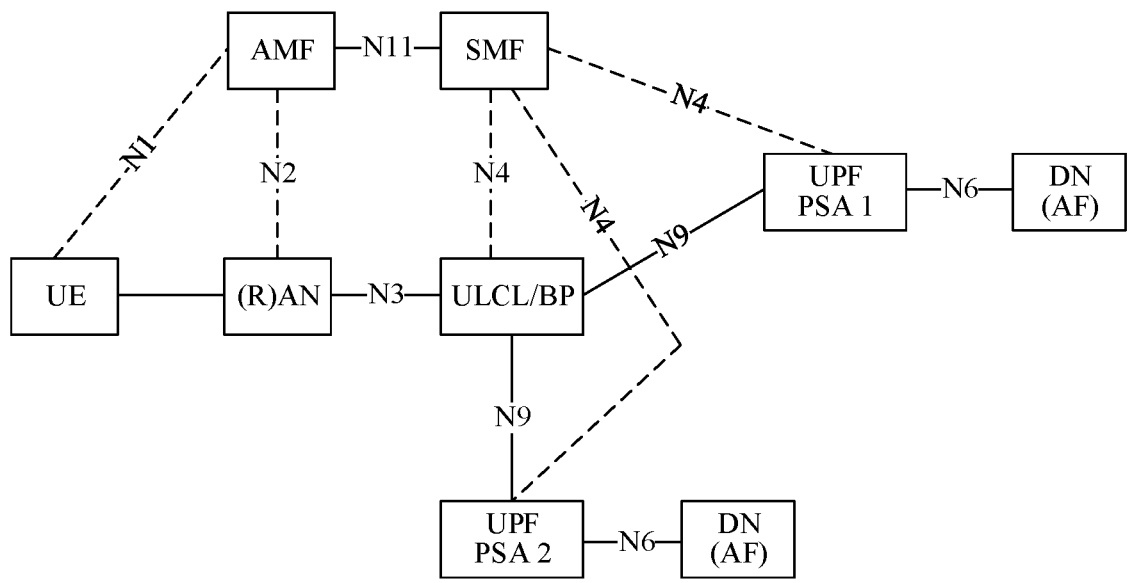
FIG. 3 is a schematic diagram of a network architecture according to an embodiment of this application.

FIG. 3 is a schematic diagram of a network architecture according to an embodiment of this application. As shown in FIG. 3, a plurality of UPFs are introduced into a network architecture of a communication system. The plurality of UPFs may be respectively an uplink classifier (ULCL)/branching point (BP), a PDU session anchor (PSA) 1, and a UPF PSA 2. The ULCL/BP may distribute an uplink data packet from UE to the PSA 1 or the PSA 2 according to a distribution rule, or may send a downlink data packet from the PSA 1 or the PSA 2 to the UE. There is an N6 interface between the PSA 1 and a DN. For example, the DN may be a DN located in a central data center (DC). There is an N6 interface between the PSA 2 and a local DN. For example, the local DN may be located in a local DC or an MEC node. The local DN may also be understood as a DN that deploys an application server in an edge hosting environment (EHE) closer to the UE, or may be referred to as an edge network (EDN). When the UE has a service requirement, an SMF may insert a UPF (namely, a local (L)-PSA) corresponding to the local DN, so that the UE can access a nearby application server in the local DN. For example, the PAS 2 in FIG. 3 is an L-PSA. It should be noted that a quantity of UPFs in FIG. 3 is merely an example, and more or fewer UPFs may alternatively be included. This is not limited in this application.

Figure 4:
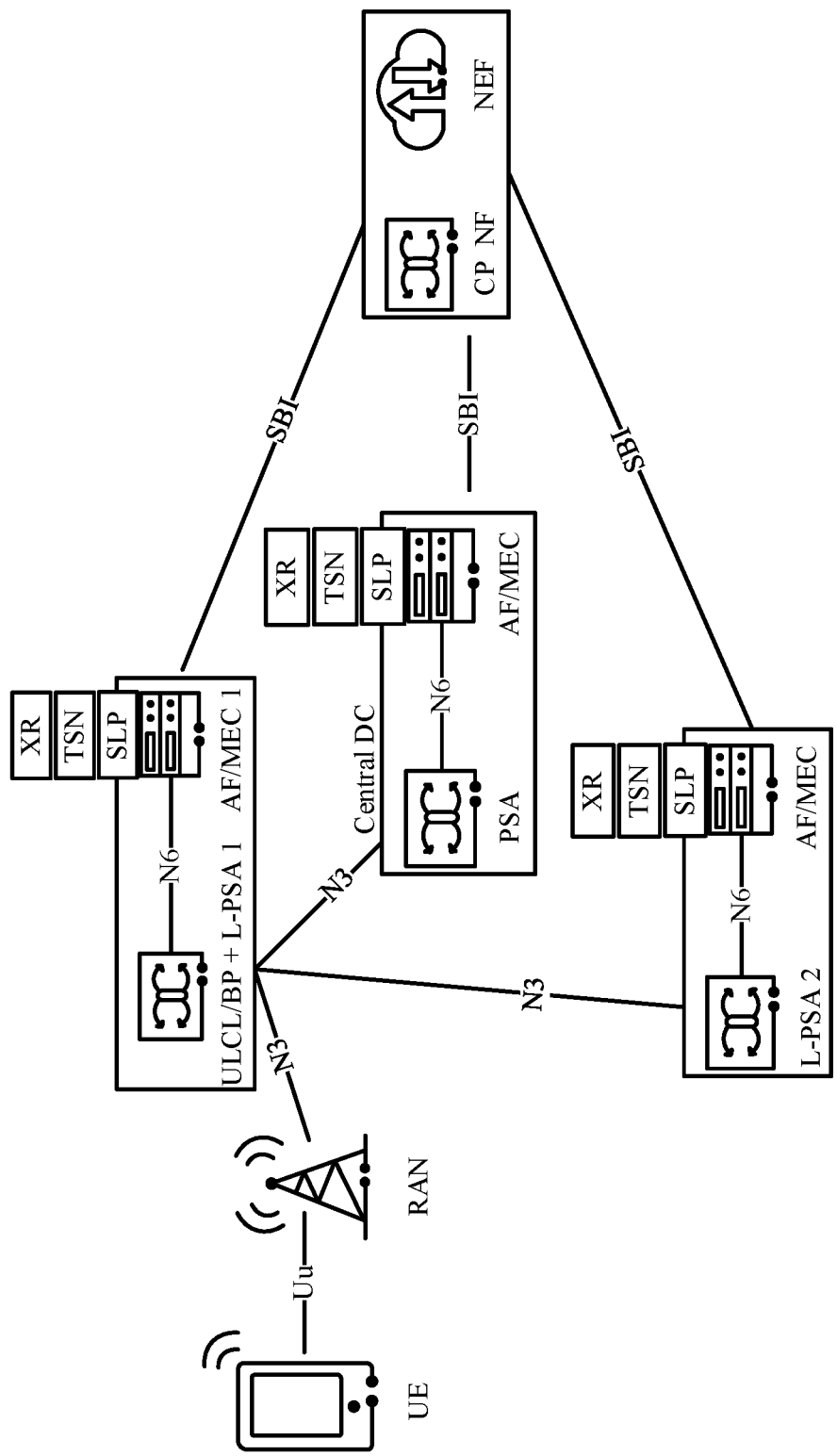
FIG. 4 is a schematic diagram of another network architecture according to an embodiment of this application.

It should be noted that only one L-PSA is shown in FIG. 3. It should be understood that a plurality of L-PSAs may alternatively be included. This is not limited in this application. FIG. 4 is a schematic diagram of another network architecture according to an embodiment of this application. As shown in FIG. 4, there may be a plurality of L-PSAs, for example, an L-PSA 1 and an L-PSA 2 in FIG. 4, in the network architecture. In this network architecture, a ULCL/BP may be connected to the plurality of L-PSAs. In this example, the ULCL/BP may be co-deployed with the L-PSA 1, and connected to an MEC 1. The L-PSA 2 may be connected to an MEC 2, and a PSA may be connected to a central DC. It should be understood that the ULCL/BP and the L-PSA 1 may alternatively be two independent network elements or devices.

Figure 5:
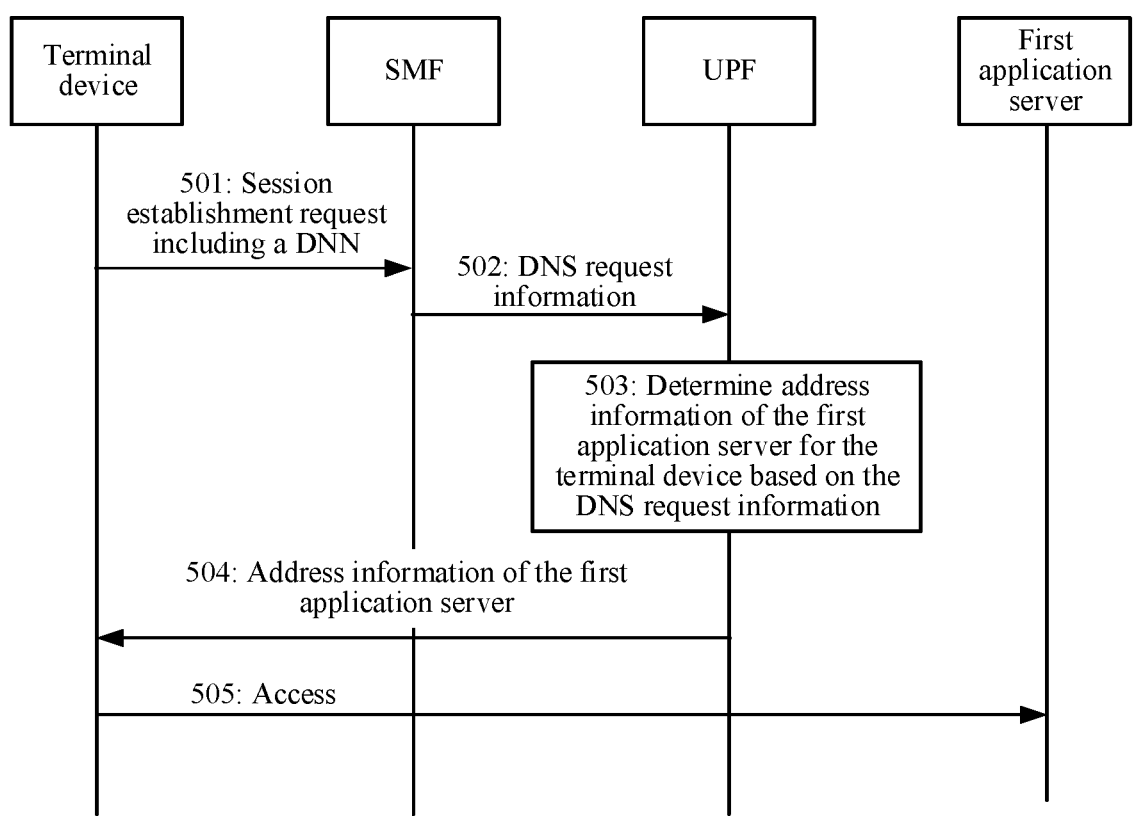
FIG. 5 is a schematic flowchart of a communication method according to an embodiment of this application.

To better understand embodiments of this application, application scenarios of embodiments of this application are first described below. FIG. 5 is a schematic flowchart of establishing communication between a terminal device and a first application server according to an embodiment of this application. As shown in FIG. 5, after receiving a session establishment request that is sent by the terminal device and that includes a DNN, an SMF sends, to a UPF, DNS request information that includes the DNN. The UPF may determine, based on the DNS request information, address information of the first application server corresponding to a service type, and send the address information of the first application server to the SMF. After receiving the address information of the first application server, the SMF may send the address information of the first application server to the terminal device, so that the terminal device can access the first application server.

In the foregoing process, before the terminal device establishes the communication with the first application server, the UPF needs to determine, based on the DNS request information, the address information of the first application server corresponding to the service type, and then send the address information of the first application server to the terminal device, so that the terminal device can access the first application server. In this process, signaling interaction between the terminal device and the application server is increased, and therefore, communication latency is caused.

In view of the foregoing problem, embodiments of this application provide a communication method and apparatus and a computer-readable storage medium, which can reduce the communication latency. Details are separately described below.

Figure 6:
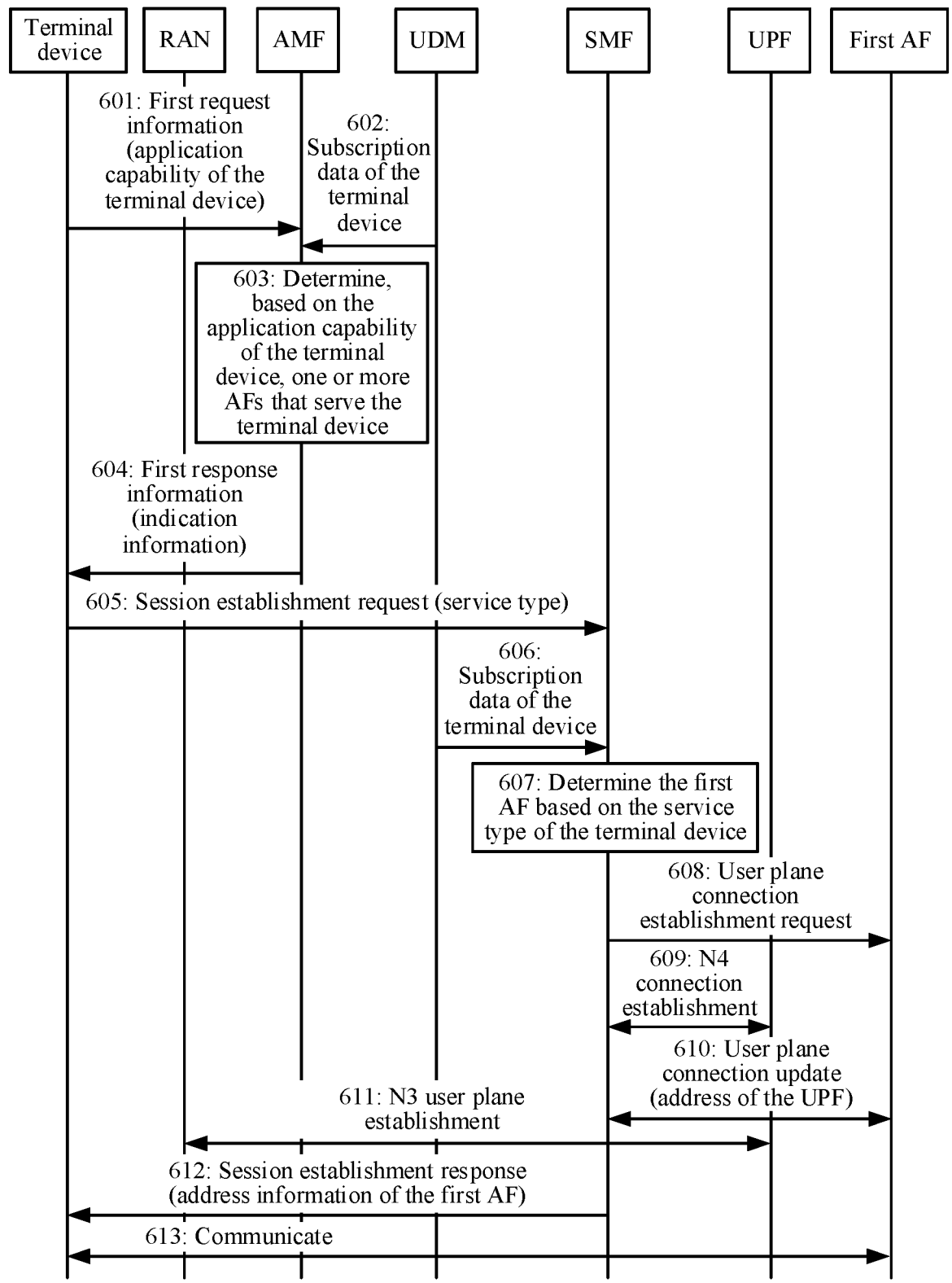
FIG. 6 is a schematic flowchart of another communication method according to an embodiment of this application.

FIG. 6 is a schematic flowchart of another communication method according to an embodiment of this application. The communication method may be applied to a 5G network architecture. In this application, a function performed by a terminal device may alternatively be performed by a module (for example, a chip) in the terminal device. In this application, a function performed by an SMF may alternatively be performed by a module (for example, a chip) in the SMF. In this application, a function performed by an AMF may alternatively be performed by a module (for example, a chip) in the AMF. As shown in FIG. 6, the communication method may include the following steps.

601: A terminal device sends, to an AMF, first request information that includes an application capability of the terminal device.

Correspondingly, the AMF may receive the first request information that is sent by the terminal device and that includes the application capability of the terminal device.

The first request information may be attach request information, which requests to attach an identifier of the terminal device to an AF that can provide a service for the application capability of the terminal device. The application capability may be a positioning application capability, a V2X application capability, a D2D application capability, a UAV application capability, a multimedia application capability, an AR/VR application capability, or the like of the terminal device.

A service model of a native capability of a current network is not unified, and a requirement on the terminal device is very high. To be specific, each time a new native capability is defined, the terminal device needs to support the native capability. Therefore, implementation complexity of the terminal device is high. The terminal device sends the attach request information to the AMF, to establish a data connection to the network. To be specific, after requesting, in the network in advance based on the application capability of the terminal device, an AF that supports the native capability of the terminal device, and establishing the connection, the terminal device may initiate any service procedure. Any service procedure uses an interaction model. This can reduce the implementation complexity of the terminal device.

602: A UDM sends subscription data of the terminal device to the AMF.

Correspondingly, the AMF may receive the subscription data of the terminal device sent by the UDM.

The subscription data of the terminal device may be sent by the UDM to the AMF after the AMF requests the subscription data from the UDM based on a requirement. An obtained message may be an on-demand system message, or may be sent by the UDM to the AMF periodically or in an event-triggered manner. The subscription data includes but is not limited to a user plane security policy, capability information of the terminal device, a consumption package of a universal subscriber identity module (SIM) card of the terminal device, and a service related to the consumption package.

603: The AMF determines, based on the application capability of the terminal device, one or more AFs that provide a service for the terminal device.

After receiving the application capability of the terminal device sent by the terminal device, the AMF may determine, based on the application capability of the terminal device, the one or more AFs that provide a service for the terminal device.

In an embodiment, after receiving the subscription data of the terminal device sent by the UDM, the AMF may also determine, based on the application capability of the terminal device and the subscription data of the terminal device, the one or more AFs that provide a service for the terminal device.

604: The AMF sends, to the terminal device, first response information that includes indication information.

Correspondingly, the terminal device may receive the first response information that is sent by the AMF and that includes the indication information.

The first response information may be attach response information, and is used to respond to the first request information. The first response information may be a specific message name, or may be a specific parameter. The indication information may indicate to the terminal device to establish a connection to the one or more AFs corresponding to the application capability of the terminal device.

605: The terminal device sends, to an SMF, a session establishment request that includes a service type.

Correspondingly, the SMF may receive the session establishment request that is sent by the terminal device and that includes the service type.

When there is a service requirement, the terminal device may send the session establishment request to the SMF. The session establishment request may include the service type of the terminal device, may include the indication information, and may further include location information of the terminal device. The service type may include a data network name DNN, a slice name S-NSSAI, an application name (application ID), and an application type. The application type may be positioning, V2X, D2D, UAV, multimedia application capability, AR/VR, or the like. The indication information may be indication information from the AMF, and is used by the terminal device to request establishing the connection to the one or more AFs corresponding to the service type. When a user uses a terminal device to browse a web page, watch a video, or play a game, an APP on the terminal device is associated with a service type of a mobile communication network. The service type of the terminal device may be an encoding format of a service currently running on the terminal device. For example, if a service of the terminal device is a video service, an encoding format of the video may be an encoding format specified by the moving picture expert group (MPEG), such as MPEG-1, MPEG-2, or MPEG-4, and an encoding format of video data may alternatively be an encoding format of H.26X series or the like.

In an embodiment, the terminal device may send the session establishment request to the SMF through the AMF. Specifically, the terminal device may send the session establishment request to the AMF. After the AMF completes authentication on the terminal device, the AMF selects, according to a policy of the AMF, the SMF that can provide a service for the terminal device. Then, the AMF forwards the session establishment request to the SMF. Optionally, the AMF may select the SMF by querying an NRF.

606: The UDM sends the subscription data of the terminal device to the SMF.

Correspondingly, the SMF may receive the subscription data of the terminal device sent by the UDM.

The SMF may not trust the subscription data reported by the terminal device. Therefore, the SMF may query the UDM for the subscription data of the terminal device, and compare the subscription data of the terminal device in the UDM with the subscription data reported by the terminal device, to determine authenticity of the subscription data reported by the terminal device. It should be noted that when the SMF does not have the subscription data of the terminal device, the SMF may perform step 606. When the AMF has the subscription data of the terminal device, the SMF may not perform step 606.

607: The SMF determines a first AF based on the service type of the terminal device.

The SMF may determine, based on the service type of the terminal device, an AF that serves a service of this type.

There may be one or more types of AFs. When there is one type of AF, the AF may be a general AF that has a plurality of capabilities. For example, the AF may be a general AF, which may support capabilities such as a video capability, an image capability, and a voice capability. For example, if a service of the terminal device is a service of a video type, the SMF may determine that the general AF is the first AF, and the first AF has a capability of supporting the service of a video type.

When there are a plurality of types of AFs, each AF may correspond to a capability. For example, a first AF supports a video service, a second AF supports an image service, and a third AF supports a voice service. There may be a plurality of AFs having a capability. For example, there may be a plurality of AFs supporting the video service, a plurality of AFs supporting the image service, and a plurality of AFs supporting the voice service. For example, if the service of the terminal device is the service of a video type, the SMF may determine, from the plurality of AFs supporting the video service, one AF to serve the service of a video type of the terminal device.

In an embodiment, the SMF may determine the first AF based on the service type of the terminal device and the subscription data of the terminal device. Different terminal devices have different subscription data. When determining the first AF based on the service type of the terminal device, the SMF may also determine the first AF based on specific subscription data of the terminal device, so that accuracy of determining the first AF can be improved.

In an embodiment, the SMF may determine the first AF based on the service type of the terminal device, the subscription data of the terminal device, and the location information of the terminal device. The SMF may determine, based on the location information of the terminal device, an AF that is closest to a location of the terminal device as the first AF. In this way, the terminal device may access a nearby first AF, and therefore, a communication rate is increased.

608: The SMF sends a user plane connection establishment request to the first AF.

Correspondingly, the first AF may receive the user plane connection establishment request sent by the SMF.

The SMF may determine address information of the first AF, and then send the user plane connection establishment request to the first AF based on the address information of the first AF. The user plane connection establishment request may include a context, for example, an IP address, of the terminal device.

609: The SMF establishes an N4 connection with a UPF.

The SMF may establish a session connection for the UPF and the first AF, and the UPF may establish a session for the terminal device and the first AF. Specifically, the SMF may send an N4 connection establishment request to the UPF based on the session establishment request. The N4 connection establishment request includes the address information of the first AF.

610: The SMF performs user plane connection update with the first AF.

The SMF may send user plane connection update information to the first AF based on the address information of the first AF. The user plane connection update information may include address information of the UPF.

611: A RAN performs N3 user plane establishment with the UPF.

When the terminal device needs to send data, the terminal device may send the data to the UPF through a user plane connection of a PDU session. The UPF receives the data, and forwards the data to an external network. When the UPF receives data that needs to be sent to the terminal device, the UPF may send the data to the terminal device through the user plane connection of the PDU session, and the terminal device receives the data through the user plane connection of the PDU session.

612: The SMF sends, to the terminal device, a session establishment response that includes the address information of the first AF.

Correspondingly, the terminal device may receive the session establishment response that is sent by the SMF and that includes the address information of the first AF.

The SMF may send the session establishment response to the terminal device, to represent that session establishment is completed.

In an embodiment, the SMF may alternatively send the session establishment response to the AMF, to represent that the session establishment is completed. Then, the AMF forwards the session establishment response to the terminal device.

613: The terminal device communicates with the first AF based on the address information of the first AF.

After receiving the session establishment response that includes the address information of the first AF and that is sent by the SMF, the terminal device may initiate access to the first AF based on the address information of the first AF. After establishment is completed, the terminal device may perform related communication with the first AF, and the terminal device may send uplink or downlink data to the first AF through the UPF.

Figure 7A:
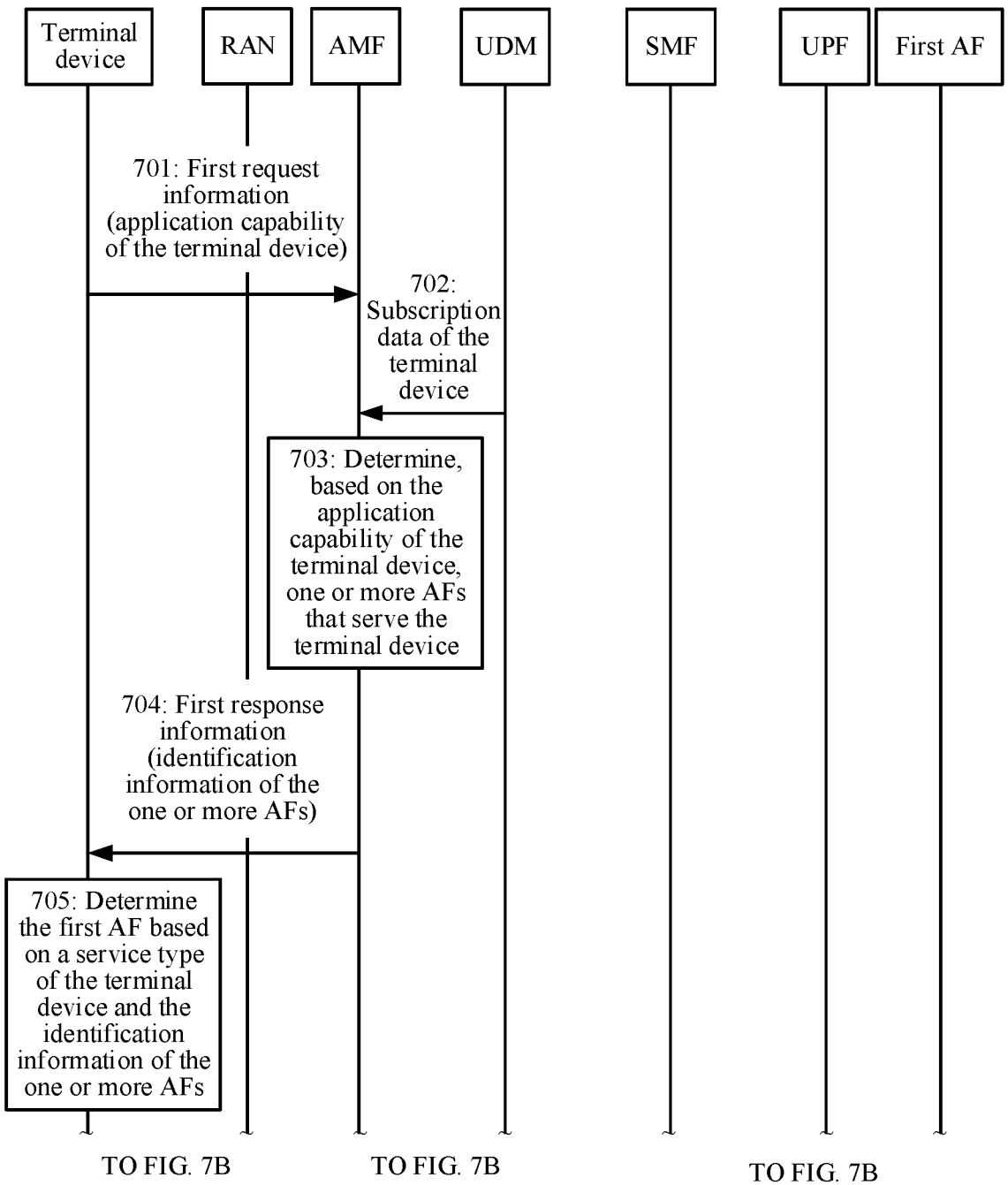
FIG. 7A and FIG. 7B are a schematic flowchart of still another communication method according to an embodiment of this application.
Figure 7B:
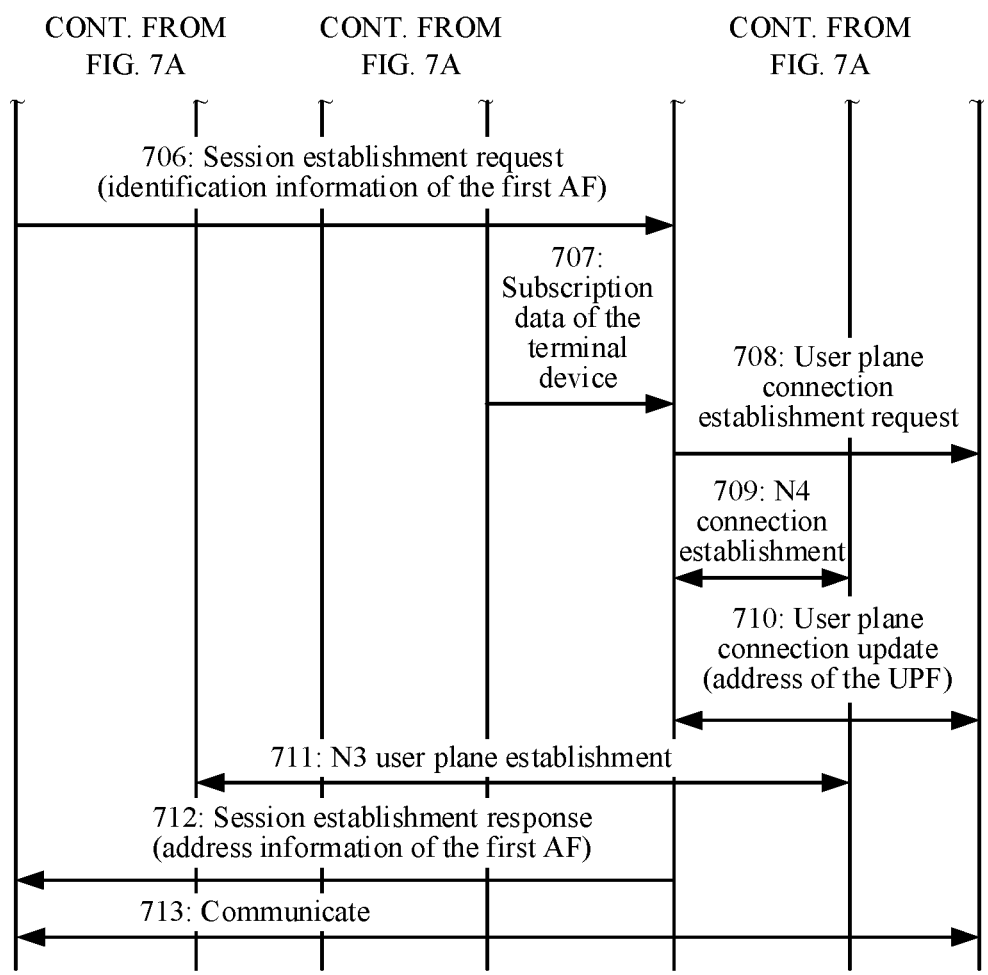

FIG. 7A and FIG. 7B are a schematic flowchart of still another communication method according to an embodiment of this application. The communication method may be applied to a 5G network architecture. In this application, a function performed by a terminal device may alternatively be performed by a module (for example, a chip) in the terminal device. In this application, a function performed by an AMF may alternatively be performed by a module (for example, a chip) in the AMF. In this application, a function performed by an SMF may alternatively be performed by a module (for example, a chip) in the SMF. As shown in FIG. 7A and FIG. 7B, the communication method may include the following steps.

701: A terminal device sends, to an AMF, first request information that includes an application capability of the terminal device.

It should be understood that step 701 corresponds to step 601. For related descriptions in step 701, refer to the foregoing descriptions in step 601. To avoid repetition, details are not described herein again.

702: A UDM sends subscription data of the terminal device to the AMF.

It should be understood that step 702 corresponds to step 602. For related descriptions in step 702, refer to the foregoing descriptions in step 602. To avoid repetition, details are not described herein again.

703: The AMF determines, based on the application capability of the terminal device, one or more AFs that provide a service for the terminal device.

It should be understood that step 703 corresponds to step 603. For related descriptions in step 703, refer to the foregoing descriptions in step 603. To avoid repetition, details are not described herein again.

704: The AMF sends, to the terminal device, first response information that includes identification information of the one or more AFs.

Correspondingly, the terminal device may receive the first response information that is sent by the AMF and that includes the identification information of the one or more AFs.

The AMF may send the first response information to the terminal device. The first response information may be attach response information, and is used to respond to the first request information. The first response information may include the identification information of the one or more AFs, the identification information may also include a type of the one or more AFs, and the first response information may further include location information corresponding to the one or more AFs.

705: The terminal device determines a first AF based on a service type of the terminal device and the identification information of the one or more AFs.

The terminal device may determine the first AF based on the service type of the terminal device and the identification information of the one or more AFs. Specifically, the terminal device may determine, based on a type of a service that needs to be initiated by the terminal device, an AF that serves the service of this type.

In an embodiment, the terminal device determines the first AF based on the service type of the terminal device and the identification information of the one or more AFs. There may be one or more types of AFs. When there is one type of AF, the AF may be a general AF that has a plurality of capabilities. For example, the AF may be a general AF, which may support capabilities such as a video capability, an image capability, and a voice capability. For example, if a service of the terminal device is a service of a video type, an SMF may determine that the general AF is the first AF, and the first AF has a capability of supporting the service of a video type.

In an embodiment, the terminal device may determine the first AF based on the service type of the terminal device, the type of the one or more AFs, and the location information corresponding to the one or more AFs. When there are a plurality of types of AFs, each AF may correspond to a capability. For example, a first AF supports a video service, a second AF supports an image service, and a third AF supports a voice service. There may be a plurality of AFs having a capability. For example, there may be a plurality of AFs supporting the video service, a plurality of AFs supporting the image service, and a plurality of AFs supporting the voice service. For example, if the service of the terminal device is the service of a video type, the SMF may determine, from the plurality of AFs supporting the video service, one AF to serve the service of a video type of the terminal device.

In an embodiment, the terminal device may determine the first AF based on the service type of the terminal device, the identification information of the one or more AFs, and the location information corresponding to the one or more AFs. The terminal device may determine, based on location information of the AF, an AF that is closest to a location of the terminal device as the first AF. In this way, the terminal device may access a nearby first AF, and therefore, a communication rate is increased.

706: The terminal device sends, to the SMF, a session establishment request that includes identification information of the first AF.

Correspondingly, the SMF may receive the session establishment request that is sent by the terminal device and that includes the identification information of the first AF.

When there is a service requirement, the terminal device may send the session establishment request to the SMF. The session establishment request may carry the identification information of the first AF. Based on the identification information of the first AF, the SMF may determine an AF to which a user plane connection establishment request is to be initiated. In this way, the terminal device may obtain the identification information of the AF that supports a specific service function in advance, to initiate the session establishment request which directly notifies a network that a data connection to the AF needs to be established. Any service procedure may use an interaction model. This can reduce communication latency.

707: The UDM sends the subscription data of the terminal device to the SMF.

It should be understood that step 707 corresponds to step 606. For related descriptions in step 707, refer to the foregoing descriptions in step 606. To avoid repetition, details are not described herein again.

708: The SMF sends the user plane connection establishment request to the first AF.

Correspondingly, the first AF may receive the user plane connection establishment request sent by the SMF.

The SMF may determine address information of the first AF based on the identification information of the first AF, and then send the user plane connection establishment request to the first AF based on the address information of the first AF.

709: The SMF establishes an N4 connection with a UPF.

It should be understood that step 709 corresponds to step 609. For related descriptions in step 709, refer to the foregoing descriptions in step 609. To avoid repetition, details are not described herein again.

710: The SMF performs user plane connection update with the first AF.

It should be understood that step 710 corresponds to step 610. For related descriptions in step 710, refer to the foregoing descriptions in step 610. To avoid repetition, details are not described herein again.

711: A RAN performs N3 user plane establishment with the UPF.

It should be understood that step 711 corresponds to step 611. For related descriptions in step 711, refer to the foregoing descriptions in step 611. To avoid repetition, details are not described herein again.

712: The SMF sends, to the terminal device, a session establishment response that includes the address information of the first AF.

It should be understood that step 712 corresponds to step 612. For related descriptions in step 712, refer to the foregoing descriptions in step 612. To avoid repetition, details are not described herein again.

713: The terminal device communicates with the first AF based on the address information of the first AF.

It should be understood that step 713 corresponds to step 613. For related descriptions in step 713, refer to the foregoing descriptions in step 613. To avoid repetition, details are not described herein again.

Figure 8A:
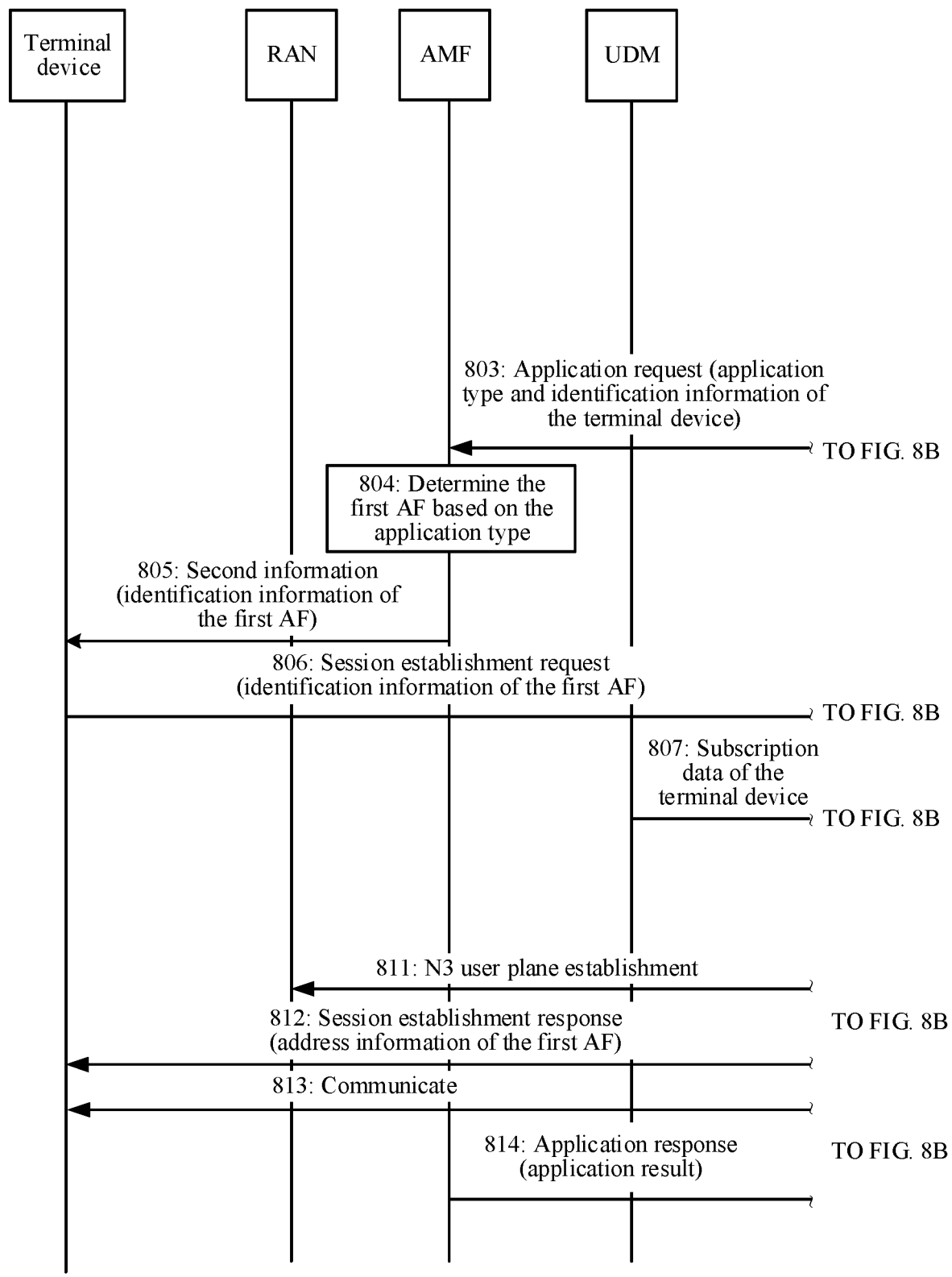
FIG. 8A and FIG. 8B are a schematic flowchart of still another communication method according to an embodiment of this application.
Figure 8B:
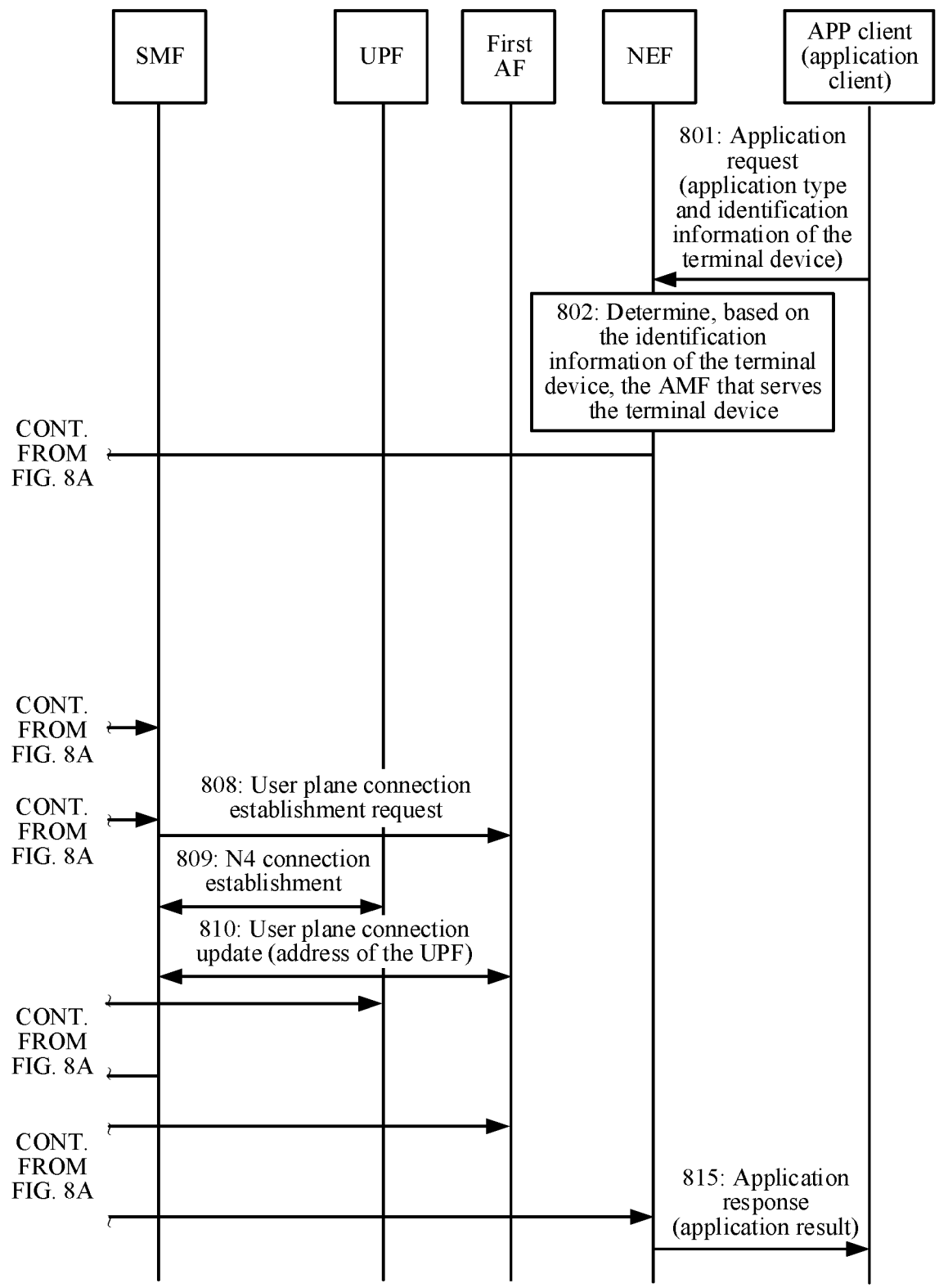

FIG. 8A and FIG. 8B are a schematic flowchart of still another communication method according to an embodiment of this application. The communication method may be applied to a 5G network architecture. In this application, a function performed by a terminal device may alternatively be performed by a module (for example, a chip) in the terminal device. In this application, a function performed by an SMF may alternatively be performed by a module (for example, a chip) in the SMF. In this application, a function performed by an AMF may alternatively be performed by a module (for example, a chip) in the AMF. In this application, a function performed by an NEF may alternatively be performed by a module (for example, a chip) in the NEF. As shown in FIG. 8A and FIG. 8B, the communication method may include the following steps.

801: An application client sends, to an NEF, an application request that includes an application type and identification information of a terminal device.

Correspondingly, the NEF may receive the application request that is sent by the application client and that includes the application type and the identification information of a terminal device.

Different APPs may be installed in the terminal device, and service requirements of data of the different APPs are different. For example, for an APP of an instant-messaging type, data of this type of APP usually needs to be transmitted in real time, to ensure good user experience. For an APP of a video play type, data transmission with low latency and high reliability is usually required. Certainly, different native applications in the terminal device may also have different data transmission requirements. For example, an application related to making a call usually has a requirement for real-time data transmission. A short message service (SMS)-related application may have a requirement for data transmission with high reliability.

In the solutions provided in this application, a mobile network may establish a user plane connection between the terminal device and a first AF as required based on a request of a third-party platform. Specifically, a third party requests the network to obtain a native network capability. The network selects, based on the request, the first AF supporting the capability, and establishes the user plane connection between the terminal device and the first AF.

802: The NEF determines, based on the identification information of a terminal device, an AMF that serves the terminal device.

The NEF may query, based on an identifier of a terminal device, a UDM for the AMF that can serve the terminal device.

803: The NEF sends, to the AMF, the application request that includes the application type and the identification information of a terminal device.

Correspondingly, the AMF may receive the application request that is sent by the NEF and that includes the application type and the identification information of a terminal device.

804: The AMF determines the first AF based on the application type.

The AMF may determine, based on the application type, an AF that serves this type of application.

There may be one or more types of AFs. When there is one type of AF, the AF may be a general AF that has a plurality of capabilities. For example, the AF may be a general AF, which may support capabilities such as a video capability, an image capability, and a voice capability. For example, if the application is an application of a video type, the AMF may determine that the general AF is the first AF, and the first AF has a capability of serving the application of a video type.

When there are a plurality of types of AFs, each AF may correspond to a capability. For example, a first AF supports a video application, a second AF supports an image application, and a third AF supports a voice application. There may be a plurality of AFs having a capability. For example, there may be a plurality of AFs supporting the video application, a plurality of AFs supporting the image application, and a plurality of AFs supporting the voice application. For example, if the application of the terminal device is the application of a video type, the AMF may determine, from the plurality of AFs supporting the video application, one AF to serve the application of a video type of the terminal device.

805: The AMF sends second information that includes identification information of the first AF to the terminal device.

Correspondingly, the terminal device may receive the second information that is sent by the AMF and that includes the identifier of the first AF.

The AMF may determine the terminal device based on the identification information of the terminal device from the NEF, and then send the second information to the terminal device.

806: The terminal device sends, to an SMF, a session establishment request that includes identification information of the first AF.

It should be understood that step 806 corresponds to step 706. For related descriptions in step 806, refer to the foregoing descriptions in step 706. To avoid repetition, details are not described herein again.

807: The UDM sends subscription data of the terminal device to the SMF.

It should be understood that step 807 corresponds to step 707. For related descriptions in step 807, refer to the foregoing descriptions in step 707. To avoid repetition, details are not described herein again.

808: The SMF sends a user plane connection establishment request to the first AF.

It should be understood that step 808 corresponds to step 708. For related descriptions in step 808, refer to the foregoing descriptions in step 708. To avoid repetition, details are not described herein again.

809: The SMF establishes an N4 connection with a UPF.

It should be understood that step 809 corresponds to step 709. For related descriptions in step 809, refer to the foregoing descriptions in step 709. To avoid repetition, details are not described herein again.

810: The SMF performs user plane connection update with the first AF.

It should be understood that step 810 corresponds to step 710. For related descriptions in step 810, refer to the foregoing descriptions in step 710. To avoid repetition, details are not described herein again.

811: A RAN performs N3 user plane establishment with the UPF.

It should be understood that step 811 corresponds to step 711. For related descriptions in step 811, refer to the foregoing descriptions in step 711. To avoid repetition, details are not described herein again.

812: The SMF sends, to the terminal device, a session establishment response that includes address information of the first AF.

It should be understood that step 812 corresponds to step 712. For related descriptions in step 812, refer to the foregoing descriptions in step 712. To avoid repetition, details are not described herein again.

813: The terminal device communicates with the first AF based on the address information of the first AF.

It should be understood that step 813 corresponds to step 713. For related descriptions in step 813, refer to the foregoing descriptions in step 713. To avoid repetition, details are not described herein again.

814: The AMF sends an application response that includes an application result to the NEF.

Correspondingly, the NEF may receive the application response that is sent by the AMF and that includes the application result.

815: The NEF sends the application response that includes the application result to the application client.

Correspondingly, the application client may receive the application response that is sent by the NEF and that includes the application result.

Figure 9:
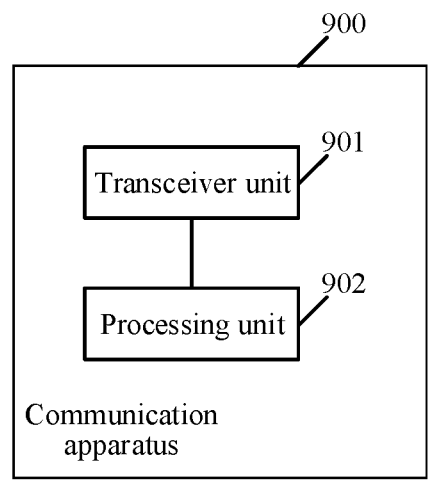
FIG. 9 is a schematic diagram of a structure of a communication apparatus according to an embodiment of this application.

Based on the foregoing network architecture, FIG. 9 is a schematic diagram of a structure of a communication apparatus according to an embodiment of this application. The communication apparatus may be a terminal device, or may be a module (for example, a chip) in the terminal device. As shown in FIG. 9, the communication apparatus 900 includes at least a transceiver unit 901 and a processing unit 902.

The transceiver unit 901 is configured to send first request information to an access management network element. The first request information carries an application capability of a terminal device.

The transceiver unit 901 is further configured to receive first response information sent by the access management network element.

The transceiver unit 901 is further configured to send a session establishment request to a session management network element based on the first response information. The session establishment request requests to establish a connection to a first application network element.

In an embodiment, the session establishment request includes a service type of the terminal device.

In an embodiment, the session establishment request further includes location information of the terminal device.

In an embodiment, the first response information includes indication information.

In an embodiment, the session establishment request includes identification information of the first application network element.

In an embodiment, the first response information includes identification information of one or more application network elements.

The communication apparatus further includes: a processing unit 902, configured to determine the first application network element based on the service type of the terminal device and the identification information of the one or more application network elements.

In an embodiment, the first response information further includes location information corresponding to the one or more application network elements.

That the processing unit 902 determines the first application network element based on the service type of the terminal device and the identification information of the one or more application network elements includes: determining the first application network element based on the service type of the terminal device, the identification information of the one or more application network elements, and the location information corresponding to the one or more application network elements.

In an embodiment, the identification information of the one or more application network elements includes a type of the one or more application network elements.

That the processing unit 902 determines the first application network element based on the service type of the terminal device, the identification information of the one or more application network elements, and the location information corresponding to the one or more application network elements includes: determining the first application network element based on the service type of the terminal device, the type of the one or more application network elements, and the location information corresponding to the one or more application network elements.

In an embodiment, the transceiver unit 901 is further configured to receive second information sent by the access management network element. The second information includes the identification information of the first application network element.

In an embodiment, the transceiver unit 901 is further configured to receive a session establishment response from the session management network element. The session establishment response includes address information of the first application network element.

The processing unit 902 is further configured to communicate with the first application network element based on the address information of the first application network element.

It may be understood that the transceiver unit 901 in some embodiments may be implemented by a transceiver or a transceiver-related circuit component, and the processing unit 902 may be implemented by a processor or a processor-related circuit component.

Figure 10:
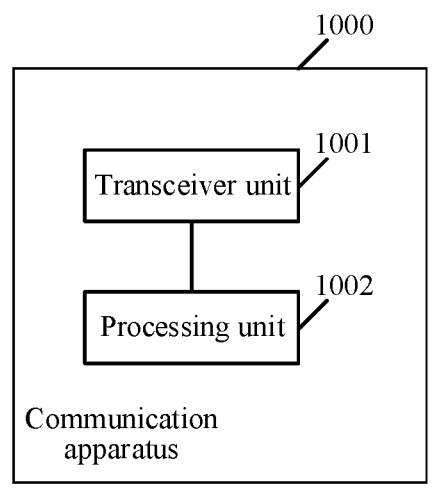
FIG. 10 is a schematic diagram of a structure of another communication apparatus according to an embodiment of this application.

Based on the foregoing network architecture, FIG. 10 is a schematic diagram of a structure of another communication apparatus according to an embodiment of this application. The communication apparatus may be a session management network element, or may be a module (for example, a chip) in the session management network element. As shown in FIG. 10, the communication apparatus 1000 includes at least a transceiver unit 1001 and a processing unit 1002.

The transceiver unit 1001 is configured to receive a session establishment request sent by a terminal device. The session establishment request requests to establish a connection to a first application network element.

The processing unit 1002 is configured to establish a connection between a user plane network element and the first application network element based on the session establishment request.

In an embodiment, the session establishment request includes a service type of the terminal device.

The processing unit 1002 is further configured to determine the first application network element based on the service type of the terminal device.

In an embodiment, the transceiver unit 1001 is further configured to obtain subscription data of the terminal device from a data management network element.

That the processing unit 1002 determines the first application network element based on the service type of the terminal device includes: determining the first application network element based on the service type of the terminal device and the subscription data of the terminal device.

In an embodiment, the session establishment request further includes location information of the terminal device.

That the processing unit 1002 determines the first application network element based on the service type of the terminal device and the subscription data of the terminal device includes: determining the first application network element based on the service type of the terminal device, the subscription data of the terminal device, and the location information of the terminal device.

In an embodiment, the session establishment request includes identification information of the first application network element.

In an embodiment, the processing unit 1002 is further configured to determine address information of the first application network element based on the identification information of the first application network element.

The transceiver unit 1001 is further configured to send a user plane connection establishment request to the first application network element based on the address information of the first application network element.

In an embodiment, that the processing unit 1002 establishes a connection between a user plane network element and the first application network element based on the session establishment request includes: sending an N4 connection establishment request to the user plane network element based on the session establishment request, where the N4 connection establishment request includes the address information of the first application network element; and sending user plane connection update information to the first application network element based on the address information of the first application network element, where the user plane connection update information includes address information of the user plane network element.

In an embodiment, the transceiver unit 1001 is further configured to send a session establishment response to the terminal device. The session establishment response includes the address information of the first application network element.

Figure 11:
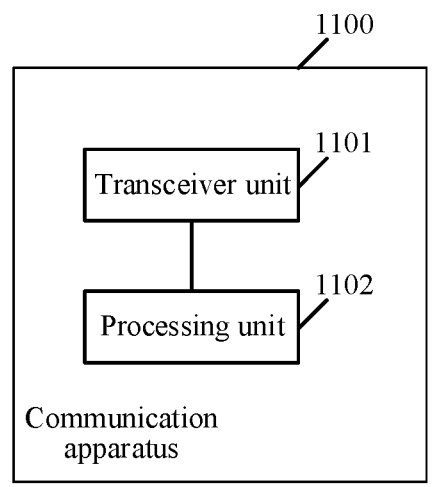
FIG. 11 is a schematic diagram of a structure of still another communication apparatus according to an embodiment of this application.

Based on the foregoing network architecture, FIG. 11 is a schematic diagram of a structure of still another communication apparatus according to an embodiment of this application. The communication apparatus may be an access management network element, or may be a module (for example, a chip) in the access management network element. As shown in FIG. 11, the communication apparatus 1100 includes at least a transceiver unit 1101 and a processing unit 1102.

The transceiver unit 1101 is configured to receive first request information sent by a terminal device. The first request information carries an application capability of the terminal device.

The processing unit 1102 is configured to determine, based on the application capability of the terminal device, one or more application network elements that provide a service for the terminal device.

In an embodiment, the transceiver unit 1101 is further configured to receive subscription data of the terminal device sent by a data management network element.

That the processing unit 1102 determines, based on the application capability of the terminal device, one or more application network elements that provide a service for the terminal device includes: determining the one or more application network elements based on the application capability of the terminal device and the subscription data of the terminal device.

In an embodiment, the transceiver unit 1101 is further configured to send first response information to the terminal device.

In an embodiment, the first response information includes indication information, and the indication information indicates the terminal device to connect to the one or more application network elements that provide a service for the terminal device.

In an embodiment, the first response information includes identification information of the one or more application network elements.

In an embodiment, the first response information further includes location information corresponding to the one or more application network elements.

Figure 12:
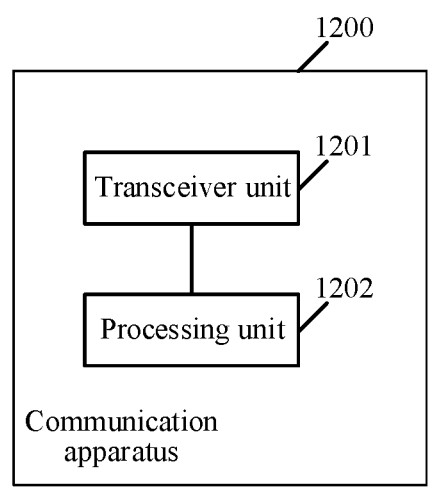
FIG. 12 is a schematic diagram of a structure of still another communication apparatus according to an embodiment of this application.

Based on the foregoing network architecture, FIG. 12 is a schematic diagram of a structure of still another communication apparatus according to an embodiment of this application. The communication apparatus may be an access management network element, or may be a module (for example, a chip) in the access management network element. As shown in FIG. 12, the communication apparatus 1200 includes at least a transceiver unit 1201 and a processing unit 1202.

The transceiver unit 1201 is configured to receive an application request sent by a network exposure network element. The application request includes an application type and identification information of a terminal device.

The processing unit 1202 is configured to determine a first application network element based on the application type.

In an embodiment, the transceiver unit 1201 is further configured to send second information to the terminal device. The second information includes identification information of the first application network element.

In an embodiment, the transceiver unit 1201 is further configured to send an application response to the network exposure network element. The application response includes an application result.

Figure 13:
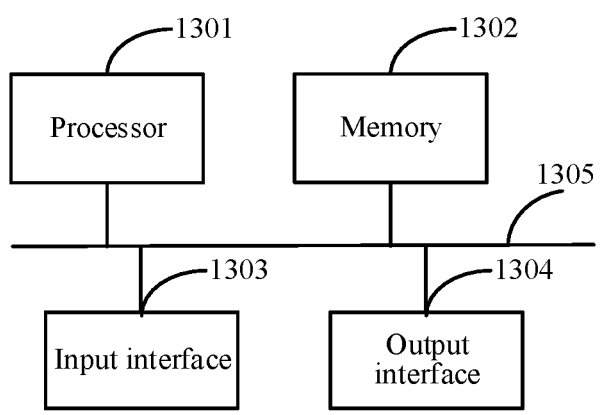
FIG. 13 is a schematic diagram of a structure of still another communication apparatus according to an embodiment of this application.

Based on the foregoing network architecture, FIG. 13 is a schematic diagram of a structure of still another communication apparatus according to an embodiment of this application. As shown in FIG. 13, the communication apparatus may include a processor 1301, a memory 1302, an input interface 1303, an output interface 1304, and a bus 1305. The memory 1302 may exist independently, and may be connected with the processor 1301 through the bus 1305. Alternatively, the memory 1302 may be integrated with the processor 1301. The bus 1305 is configured to implement connections between these components.

In an embodiment, the communication apparatus may be a terminal device or a module (for example, a chip) in the terminal device. When computer program instructions stored in the memory 1302 are executed, the processor 1301 is configured to control the processing unit 902 to perform an operation performed in the foregoing embodiment. The input interface 1303 and the output interface 1304 are configured to perform operations performed by the transceiver unit 901 in the foregoing embodiment. The terminal device or the module in the terminal device may be further configured to perform the methods performed by the terminal device in the method embodiments in FIG. 9, FIG. 10, and FIG. 11. Details are not described again.

In an embodiment, the communication apparatus may be a session management network element or a module (for example, a chip) in the session management network element. When the computer program instructions stored in the memory 1302 are executed, the processor 1301 is configured to control the processing unit 1002 to perform an operation performed in the foregoing embodiment. The input interface 1303 and the output interface 1304 are configured to perform operations performed by the transceiver unit 1001 in the foregoing embodiment. The session management network element or the module in the session management network element may be further configured to perform the methods performed by the terminal device in the method embodiments in FIG. 9, FIG. 10, and FIG. 11. Details are not described again.

In an embodiment, the communication apparatus may be an access management network element or a module (for example, a chip) in the access management network element. When the computer program instructions stored in the memory 1302 are executed, the processor 1301 is configured to control the processing unit 1102 to perform an operation performed in the foregoing embodiment. The input interface 1303 and the output interface 1304 are configured to perform operations performed by the transceiver unit 1101 in the foregoing embodiment. The access management network element or the module in the access management network element may be further configured to perform the methods performed by the terminal device in the method embodiments in FIG. 9, FIG. 10, and FIG. 11. Details are not described again.

In an embodiment, the communication apparatus may be an access management network element or a module (for example, a chip) in the access management network element. When the computer program instructions stored in the memory 1302 are executed, the processor 1301 is configured to control the processing unit 1202 to perform an operation performed in the foregoing embodiment. The input interface 1303 and the output interface 1304 are configured to perform operations performed by the transceiver unit 1201 in the foregoing embodiment. The access management network element or the module in the access management network element may be further configured to perform the methods performed by the terminal device in the method embodiments in FIG. 9, FIG. 10, and FIG. 11. Details are not described again.

Figure 14:
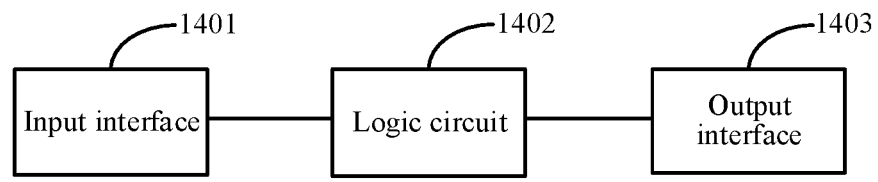
FIG. 14 is a schematic diagram of a structure of still another communication apparatus according to an embodiment of this application.

Based on the foregoing network architecture, FIG. 14 is a schematic diagram of a structure of still another communication apparatus according to an embodiment of this application. As shown in FIG. 14, the communication apparatus may include an input interface 1401, a logic circuit 1402, and an output interface 1403. The input interface 1401 is connected to the output interface 1403 through the logic circuit 1402. The input interface 1401 is configured to receive information from another communication apparatus, and the output interface 1403 is configured to output, schedule, or send information to the another communication apparatus. The logic circuit 1402 is configured to perform operations other than operations of the input interface 1401 and the output interface 1403, for example, implement functions implemented by the processor 1301 in the foregoing embodiment. The communication apparatus may be a network device or a module of the network device, may be a session management network element or a module of the session management network element, or may be an access management network element or a module of the access management network element. For more detailed descriptions of the input interface 1401, the logic circuit 1402, and the output interface 1403, directly refer to related descriptions of the terminal device, the session management network element, or the access management network element in the foregoing method embodiments. Details are not described herein again.

An embodiment of this application further provides a computer-readable storage medium. The computer-readable storage medium stores a computer program. When the program is executed by a processor, a procedure related to the terminal device in the communication method provided in the foregoing method embodiments may be implemented.

An embodiment of this application further provides a computer-readable storage medium. The computer-readable storage medium stores a computer program. When the program is executed by a processor, a procedure related to the session management network element in the communication method provided in the foregoing method embodiments may be implemented.

An embodiment of this application further provides a computer-readable storage medium. The computer-readable storage medium stores a computer program. When the program is executed by a processor, a procedure related to the access management network element in the communication method provided in the foregoing method embodiments may be implemented.

An embodiment of this application further provides a computer program product. When the computer program product runs on a computer or a processor, the computer or the processor is enabled to perform one or more steps in any one of the foregoing communication methods. When the foregoing modules in the device are implemented in a form of a software functional unit and sold or used as an independent product, the modules may be stored in the computer-readable storage medium.

An embodiment of this application further provides a communication system. The communication system may include a terminal device, a session management network element, and an access management network element. For specific descriptions, refer to the communication methods shown in FIG. 6, FIG. 7A and FIG. 7B, and FIG. 8A and FIG. 8B.

It may be understood that the memory mentioned in embodiments of this application may be a volatile memory or a non-volatile memory, or may include a volatile memory and a non-volatile memory. The non-volatile memory may be a hard disk drive (HDD), a solid-state drive (SSD), a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store program instructions and/or data.

It should be understood that the processor mentioned in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be noted that the memory described in this specification is intended to include but is not limited to these memories and any memory of another proper type.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments provided in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium, such as a universal serial bus (USB) flash drive, a removable hard disk, a ROM, a RAM, a magnetic disk, or an optical disc, that can store program code.

A sequence of the steps of the method in embodiments of this application may be adjusted in sequence, combined, or deleted based on an actual requirement.

The modules/units in the apparatus in embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, a person of ordinary skill in the art should understand that the technical solutions described in the foregoing embodiments may still be modified, or some technical features in the technical solutions may be equivalently replaced. These modifications or replacements do not make the essence of the corresponding technical solutions fall outside the scope of the technical solutions of embodiments of this application.

What is claimed is:

1. A communication method, comprising:
    sending first request information to an access management network element, wherein the first request information comprises an application capability of a terminal device;
    receiving first response information sent by the access management network element, wherein the first response information comprises identification information of one or more application network elements and location information corresponding to the one or more application network elements;
    determining a first application network element based on a service type of the terminal device, the identification information of the one or more application network elements, and the location information corresponding to the one or more application network elements; and
    sending a session establishment request to a session management network element based on the first response information, wherein the session establishment request requests establishing a connection to the first application network element.

2. The method according to claim 1, wherein the session establishment request comprises the service type of the terminal device.

3. The method according to claim 2, wherein the session establishment request further comprises location information of the terminal device.

4. The method according to claim 1, wherein the first response information comprises indication information, and the indication information indicates to the terminal device to connect to the one or more application network elements that provide a service for the terminal device.

5. The method according to claim 1, wherein the session establishment request comprises identification information of the first application network element.

6. The method according to claim 1, wherein the identification information of the one or more application network elements comprises a type of the one or more application network elements; and the determining of the first application network element based on the service type of the terminal device, the identification information of the one or more application network elements, and the location information corresponding to the one or more application network elements comprises:

determining the first application network element based on the service type of the terminal device, the type of the one or more application network elements, and the location information corresponding to the one or more application network elements.

7. The method according to claim 1, wherein the method further comprises:

receiving a session establishment response from the session management network element, wherein the session establishment response comprises address information of the first application network element; and communicating with the first application network element based on the address information of the first application network element.

8. A communication apparatus, comprising a processor and a memory, where the processor invokes a computer program stored in the memory to perform:

sending first request information to an access management network element, wherein the first request information comprises an application capability of the communication apparatus;

receiving first response information sent by the access management network element wherein the first response information comprises identification information of one or more application network elements and location information corresponding to the one or more application network elements;

determining a first application network element based on a service type of the communication apparatus, the identification information of the one or more application network elements, and the location information corresponding to the one or more application network elements; and sending a session establishment request to a session management network element based on the first response information, wherein the session establishment request requests establishing a connection to the first application network element.

9. The communication apparatus according to claim 8, wherein the session establishment request comprises the service type of the communication apparatus.

10. The communication apparatus according to claim 9, wherein the session establishment request further comprises location information of the communication apparatus.

11. The communication apparatus according to claim 8, wherein the first response information comprises indication information, and the indication information indicates to the communication apparatus to connect to the one or more application network elements that provide a service for the communication apparatus.

12. The communication apparatus according to claim 8, wherein the session establishment request comprises identification information of the first application network element.

13. The communication apparatus according to claim 8, wherein the identification information of the one or more application network elements comprises a type of the one or more application network elements; and the determining of the first application network element based on the service type of the communication apparatus, the identification information of the one or more application network elements, and the location information corresponding to the one or more application network elements comprises:

determining the first application network element based on the service type of the communication apparatus, the type of the one or more application network elements, and the location information corresponding to the one or more application network elements.

14. The communication apparatus according to claim 8, where the processor further invokes a computer program stored in the memory to perform:

receiving a session establishment response from the session management network element, wherein the session establishment response comprises address information of the first application network element; and communicating with the first application network element based on the address information of the first application network element.

15. A non-transitory computer-readable storage medium storing a computer program that when executed by a processor causes a terminal device to perform:

sending first request information to an access management network element, wherein the first request information comprises an application capability of the terminal device;

receiving first response information sent by the access management network element, wherein the first response information comprises identification information of one or more application network elements and location information corresponding to the one or more application network elements;

determining a first application network element based on a service type of the terminal device, the identification information of the one or more application network elements, and the location information corresponding to the one or more application network elements; and sending a session establishment request to a session management network element based on the first response information, wherein the session establishment request requests establishing a connection to the first application network element.

16. The non-transitory computer-readable storage medium according to claim 15, wherein the session establishment request comprises the service type of the terminal device.

17. The non-transitory computer-readable storage medium according to claim 16, wherein the session establishment request further comprises location information of the terminal device.

18. The non-transitory computer-readable storage medium according to claim 15, wherein the first response information comprises indication information, and the indication information indicates to the terminal device to connect to the one or more application network elements that provide a service for the terminal device.

19. The non-transitory computer-readable storage medium according to claim 15, wherein the session establishment request comprises identification information of the first application network element.

20. The non-transitory computer-readable storage medium according to claim 15, wherein the identification information of the one or more application network elements comprises a type of the one or more application network elements; and
    the determining of the first application network element based on the service type of the terminal device, the identification information of the one or more application network elements, and the location information corresponding to the one or more application network elements comprises:
determining the first application network element based on the service type of the terminal device, the type of the one or more application network elements, and the location information corresponding to the one or more application network elements.

\* \* \* \* \*